(12) United States Patent
Arik et al.

(10) Patent No.: US 11,462,209 B2
(45) Date of Patent: Oct. 4, 2022

(54) SPECTROGRAM TO WAVEFORM SYNTHESIS USING CONVOLUTIONAL NETWORKS

(71) Applicant: Baidu USA, LLC, Sunnyvale, CA (US)

(72) Inventors: Sercan Arik, San Francisco, CA (US); Hee Woo Jun, Sunnyvale, CA (US); Eric Undersander, San Francisco, CA (US); Gregory Diamos, Menlo Park, CA (US)

(73) Assignee: Baidu USA LLC, Sunnyvale, CA (US)

( * ) Notice: Subject to any disclaimer, the term of this patent is extended or adjusted under 35 U.S.C. 154(b) by 697 days.

(21) Appl. No.: 16/365,673

(22) Filed: Mar. 27, 2019

(65) Prior Publication Data

US 2019/0355347 A1 Nov. 21, 2019

Related U.S. Application Data

(60) Provisional application No. 62/765,316, filed on Aug. 20, 2018, provisional application No. 62/673,353, filed on May 18, 2018.

(51) Int. Cl.
*G10L 15/00* (2013.01)
*G10L 15/06* (2013.01)
(Continued)

(52) U.S. Cl.
CPC ............ *G10L 15/063* (2013.01); *G10L 15/16* (2013.01); *G10L 25/18* (2013.01); *G10L 19/00* (2013.01); *G10L 25/30* (2013.01)

(58) Field of Classification Search
CPC combination set(s) only.
See application file for complete search history.

(56) References Cited

U.S. PATENT DOCUMENTS

2011/0035215 A1* 2/2011 Sompolinsky .......... G10L 15/02
704/231
2018/0232571 A1* 8/2018 Bathiche ................. G10L 15/22
(Continued)

OTHER PUBLICATIONS

Wang et al.,"Tacotron: Towards end-to-end Speech Synthesis," arXiv preprint arXiv:1703.10135, 2017. (10 pgs).
(Continued)

*Primary Examiner* — Vu B Hang
(74) *Attorney, Agent, or Firm* — North Weber & Baugh LLP

(57) ABSTRACT

For the problem of waveform synthesis from spectrograms, presented herein are embodiments of an efficient neural network architecture, based on transposed convolutions to achieve a high compute intensity and fast inference. In one or more embodiments, for training of the convolutional vocoder architecture, losses are used that are related to perceptual audio quality, as well as a GAN framework to guide with a critic that discerns unrealistic waveforms. While yielding a high-quality audio, embodiments of the model can achieve more than 500 times faster than real-time audio synthesis. Multi-head convolutional neural network (MCNN) embodiments for waveform synthesis from spectrograms are also disclosed. MCNN embodiments enable significantly better utilization of modern multi-core processors than commonly-used iterative algorithms like Griffin-Lim and yield very fast (more than 300× real-time) waveform synthesis. Embodiments herein yield high-quality speech synthesis, without any iterative algorithms or autoregression in computations.

20 Claims, 19 Drawing Sheets

(51) Int. Cl.
*G10L 25/18* (2013.01)
*G10L 15/16* (2006.01)
*G10L 25/30* (2013.01)
*G10L 19/00* (2013.01)

(56) References Cited

U.S. PATENT DOCUMENTS

2019/0304480 A1* 10/2019 Narayanan ............ G06N 3/0472
2019/0325290 A1* 10/2019 Tong .................... G06N 3/0427

OTHER PUBLICATIONS

Jouppi et al.,"In-datacenter performance analysis of a tensor processing unit," arXiv preprint arXiv: 1704.04760. 2017. (17 pgs).
Jia et al.,"GPURoofline: A Model for Guiding Performance Optimizations on GPUs," European Conference on Parallel Processing, 2012. (3pgs).
Grinstein et al.,"Audio Style Transfer," arXiv preprint arXiv: 1710.11385, 2018. (5 pgs).
Donahue et al.,"Exploring speech enhancement with generative adversarial networks for robust speech recognition," arXiv preprint arXiv:1711.05747, 2018. (6pgs).
Dumoulin et al.,"A guide to convolution arithmetic for deeplearning," arXiv preprint arXiv:1603.07285, 2018. (31pgs).
Clevert et al.,"Fast and accurate deep network learning by exponential linear units (ELUs)," arXiv preprint arXiv:1511.07289, 2016. (14pgs).
Engel et al.,"Neural Audio Synthesis of Musical Noteswith WaveNet Autoencoders," arXiv preprint arXiv: 1704.01279, 2017.(16pgs).
Panayotov et al., "Librispeech: an ASR corpus based on public domain audio books," in Acoustics, Speech & Signal Processing (ICASSP), IEEE Intr. Conf. on. IEEE, 2015.(5pgs).
Kingma et al.,"ADAM: A method for stochastic optimization," arXiv preprint arXiv: 1412.6980, 2017. (15pgs).
Donahue et al.,"ADVERSARIAL AUDIO SYNTHESIS," arXiv preprint arXiv:1802.04208, 2019. (16pgs).
Goodfellow et al.,"Generative Adversarial Nets," arXiv preprint arXiv: 1406.2661, 2014. (9pgs).
Gulrajani et al.,"Improved Training of Wasserstein GANs," arXiv preprint arXiv:1704.00028, 2017. (20pgs).
Karras et al.,"Progressive Growing of GANs For Improved Quality, Stability,and Variation," arXiv preprint arXiv:1710.10196, 2018. (26pgs).
Maas et al.,"Rectifier Nonlinearities Improve Neural Network Acoustic Models," In ICML Workshop on Deep Learning for Audio, Speech and Language Processing, 2013. (6 pgs).
Mao et al.,"Least Squares Generative Adversarial Networks," arXiv preprint arXiv: 1611.04076, 2017. (16pgs).
Pascual et al.,"SEGAN: Speech Enhancement Generative Adversarial Network," arXiv preprint arXiv:1703.09452, 2017. (5pgs).

Radford et al.,"Unsupervised representation learning with deep convolutional generative adversarial networks," arXiv preprint arXiv:1511.06434, 2016. (16pgs).
Reed et al.,"Few-shot autoregressive density estimation: Towards learning to learn distributions," arXiv preprint arXiv:1710.10304, 2018. (11pgs).
Arik et al., "Neural Voice Cloning with a Few Samples," arXiv preprint arXiv:1802.06006, 2018. (18pgs).
Odena et al.,"Deconvolution and checkerboard artifacts," Distill, [online], [Retrieved Jul. 24, 2020], Retrieved from Internet <URL:https://distill.pub/2016/deconv-checkerboard/> 2016. (7pgs).
Arik et al.,"Deep Voice: Real-time Neural Text-to-Speech," arXiv preprint arXiv:1702.07825, 2017. (17pgs).
BenchFFT, "FFT Benchmark Methodology," [online], [Retrieved Jul. 24, 2020], Retrieved from Internet <URL:http://www.fftw.org/speed/method.html> (2pgs).
"Tensorflow profiler and advisor," [online], [Retrieved May 12, 2020], Retrieved from Internet <URL:https://github.com/tensorflow/> (3 pgs).
Arjovsky et al.,"Wasserstein Generative Adversarial Networks," In Proc. of the 34th Intr. Conf. on Machine Learning, ICML 2017. (10pgs).
Ba et al.,"Layer Normalization," arXiv preprint arXiv:1607.0645, 2016. (14pgs).
Beauregard et al.,"Single pass spectrogram inversion," In 2015 IEEE International Conference on Digital Signal Processing (DSP), 2015. (6 pgs).
Bellemare et al.,"The Cramer Distance as a Solution to BiasedWasserstein Gradients," arXiv preprint arXiv: 1705.10743, 2017. (20ps).
Griffin et al.,"Signal estimation from modified short-timefourier transform," IEEE Transactions on Acoustics,Speech,and Signal Processing,vol. 32,No. 2, pp. 236-243,1984.(8pgs).
Perraudin et al.,"A Fast Griffin-Lim Algorithm," in 2013 IEEE Workshop on Applications of Signal Processing to Audio and Acoustics, 2013. (5pgs).
Prusa et al.,"A Non-iterative Method for Reconstruction of Phasefrom STFT Magnitud," IEEE/ACM Transactions on Audio, Speech, and Language Processing, 2017. (10 pgs).
Sun et al.,"Estimating a Signal from a MagnitudeSpectrogram via Convex Optimization," arXiv preprint arXiv:1209.2076, 2012. (7pgs).
Van den Oord et al.,"Parallel WaveNet: Fast high-fidelity speech synthesis," arXiv preprint arXiv:1711.10433, 2017. (11 pgs).
Shen et al., "Natural TTS synthesis by conditioning wavenet on mel spectrogram predictions," arXiv preprint arXiv:1712.05884, 2018. (5pgs).
Arik et al.,"Deep Voice 2: Multi-Speaker Neural Text-to-Speech," arXiv preprint arXiv:1705.08947, 2017. (15pgs).
Van den Oord et al.,"Wavenet: A generative model for raw audio," arXiv preprint arXiv:1609.03499, 2016. (15 pgs).
Ping et al., "Deep Voice 3: Scaling text-To-Speech With convolutional sequence learning," arXiv preprint arXiv:1710.07654, 2018. (16pgs).

* cited by examiner

300

305 — Input an input spectrogram (having a corresponding ground truth audio) comprising a number of frequency channels into a convolution neural network (CNN) comprising at least one head, in which a head comprises a set of transposed convolution layers in which each transpose convolution layer is separated by a nonlinearity operation, the set of transposed convolution layers reducing the number of frequency channels of the spectrogram to one channel after a last transposed convolution layer of the set of transposed convolution layers

310 — Responsive to the CNN comprising a plurality of heads, obtain a weighted combination output of the output of each head by a value for each head output, which may be a trainable value; otherwise use the single-head output

315 — Apply a scaling function to the output to obtain a final output waveform

320 — Using the ground truth audio, the output waveform, and a combined loss function comprising at least one or more loss components selected from spectral convergence loss, log-scale STFT-magnitude loss, instantaneous frequency loss, weighted phase loss, waveform envelope loss, and generative adversarial network loss, to compute a loss for the CNN

325 — Using the loss to update the CNN through backpropagation

┌─────────────────────────────────────────────────┐
│ Input an input spectrogram comprising a number of frequency │
│ channels into a convolution neural network (CNN) comprising at │
│ least one head, in which a head comprises a set of transposed │
│ convolution layers in which each transpose convolution layer is │ ─ 405
│ separated by a nonlinearity operation, the set of transposed │
│ convolution layers reducing the number of frequency channels │
│ of the spectrogram to one channel after a last transposed │
│ convolution layer of the set of transposed convolution layers │
└─────────────────────────────────────────────────┘
                          │
                          ▼
┌─────────────────────────────────────────────────┐
│ Responsive to the CNN comprising a plurality of heads, │
│ obtaining a weighted combination output using the output of │ ─ 410
│ each head weighted by a value for each head output; otherwise │
│ output the single-head output │
└─────────────────────────────────────────────────┘
                          │
                          ▼
┌─────────────────────────────────────────────────┐
│ Apply a scaled function to the output to obtain a final output │ ─ 415
│ waveform │
└─────────────────────────────────────────────────┘

FIG. 4

SPECTROGRAM TO WAVEFORM SYNTHESIS USING CONVOLUTIONAL NETWORKS

CROSS-REFERENCE TO RELATED APPLICATION

This application claims the priority benefit under 35 USC § 119(e) to U.S. Prov. Pat. App. Ser. No. 62/673,353, filed on 18 May 2018, entitled "SPECTROGRAM TO WAVEFORM SYNTHESIS USING CONVOLUTIONAL GENERATIVE ADVERSARIAL NETWORKS," and listing Sercan Arik, Hee Woo Jun, Eric Undersander, and Gregory Diamos, as inventors. The aforementioned patent document is incorporated by reference herein in its entirety.

This application also claims the priority benefit under 35 USC § 119(e) to U.S. Prov. Pat. App. Ser. No. 62/765,316, filed on 20 Aug. 2018, entitled "FAST SPECTROGRAM INVERSION USING MULTI-HEAD CONVOLUTIONAL NEURAL NETWORKS," and listing Sercan Arik, Hee Woo Jun, and Gregory Diamos, as inventors. The aforementioned patent document is incorporated by reference herein in its entirety.

The patent or application file contains at least one drawing executed in color. Copies of this patent or patent application publication with color drawing(s) will be provided by the Office upon request and payment of the necessary fee.

BACKGROUND

A. Technical Field

The present disclosure relates generally to systems and methods for computer learning that can provide improved computer performance, features, and uses. More particularly, the present disclosure relates to embodiments of efficient neural network architecture that achieve a high compute intensity and fast inference.

B. Background

Deep neural networks have demonstrated good performance on challenging research benchmarks, while pushing the frontiers of numerous impactful applications such as language translation, speech recognition, and speech synthesis.

A commonly used element is a spectrogram. A spectrogram typically contains intensity information of time-varying spectrum of a waveform. Waveform-to-spectrogram conversion is fundamentally lossy, because of magnitude squaring of short-time Fourier transform (STFT). Spectrogram inversion has been studied widely in literature. Yet, there is no known algorithm that guarantees a globally optimal solution at a low computational complexity. A fundamental challenge is the non-convexity of intensity constraints with an unknown phase.

One of the most popular techniques for spectrogram inversion is the Griffin-Lim (GL) algorithm. GL is based on iteratively estimating the unknown phases by repeatedly converting between frequency and time domains using the STFT and its inverse, substituting the magnitude of each frequency component to the predicted magnitude at each step. Although the simplicity of GL is appealing, it can be slow due to the sequentiality of operations. A fast variant was studied by modifying its update step with a term that depends on the magnitude of the previous update step. A single-pass spectrogram inversion (SPSI) algorithm has been explored, which allegedly can synthesize the waveform in a single fully deterministic pass and may be further improved with extra GL iterations. SPSI estimates the instantaneous frequency of each frame by peak-picking and quadratic interpolation. Another non-iterative spectrogram inversion technique has been proposed, which is based on the direct relationship between the partial derivatives of the phase and the magnitude of the STFT with respect to the Gaussian window assumption, which allows analytical derivations. A convex relaxation has been applied to the spectrogram inversion, to express it as a semidefinite program, which has the convergence guarantee at the expense of the increased dimensionality. Overall, one common drawback for these generic spectrogram inversion techniques is that they have fixed objective functions, rendering them inflexible to adapt for a particular domain like human speech to improve the perceptual quality of the outputs.

One common use case of spectrograms is the audio domain. Autoregressive modeling of waveforms, in particular for audio, is a common approach. State-of-the-art results in generative speech modeling use neural networks that employ autoregression at the sample rate. Yet, these models bring challenges for deployment, as they need to run inference ~16k-24k times every second. One approach is to approximate autoregression with an inference-efficient model, which can be trained by learning an inverse-autoregressive flow using distillation. Recently, autoregressive neural networks have also been adapted for spectrogram inversion. But autoregression at sample rate can result in slow synthesis. A fundamental question is whether high quality synthesis necessitates explicit autoregressive modeling. Some generative models synthesize audio by applying autoregression at the rate of spectrogram timeframes (e.g., 100s of samples), and still does not yield a noticeable decrease in audio quality.

Accordingly, what is needed are improved systems and methods for waveform synthesis from spectrograms.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 shows a graphical depiction of an architecture of a generative model, according to embodiments of the present disclosure.

FIG. 3 depicts a general methodology for training a convolution neural network (CNN) that may be used to generate a synthesized waveform from an input spectrogram, according to embodiments of the present disclosure.

FIG. 4 depicts a general methodology for using a trained convolution neural network (CNN) to generate a synthesized waveform from an input spectrogram, according to embodiments of the present disclosure.

Hz, and for a spectrogram input of superposed sinusoids at 1000 and 2000 Hz, according to embodiments of the present disclosure.

Figure 7:
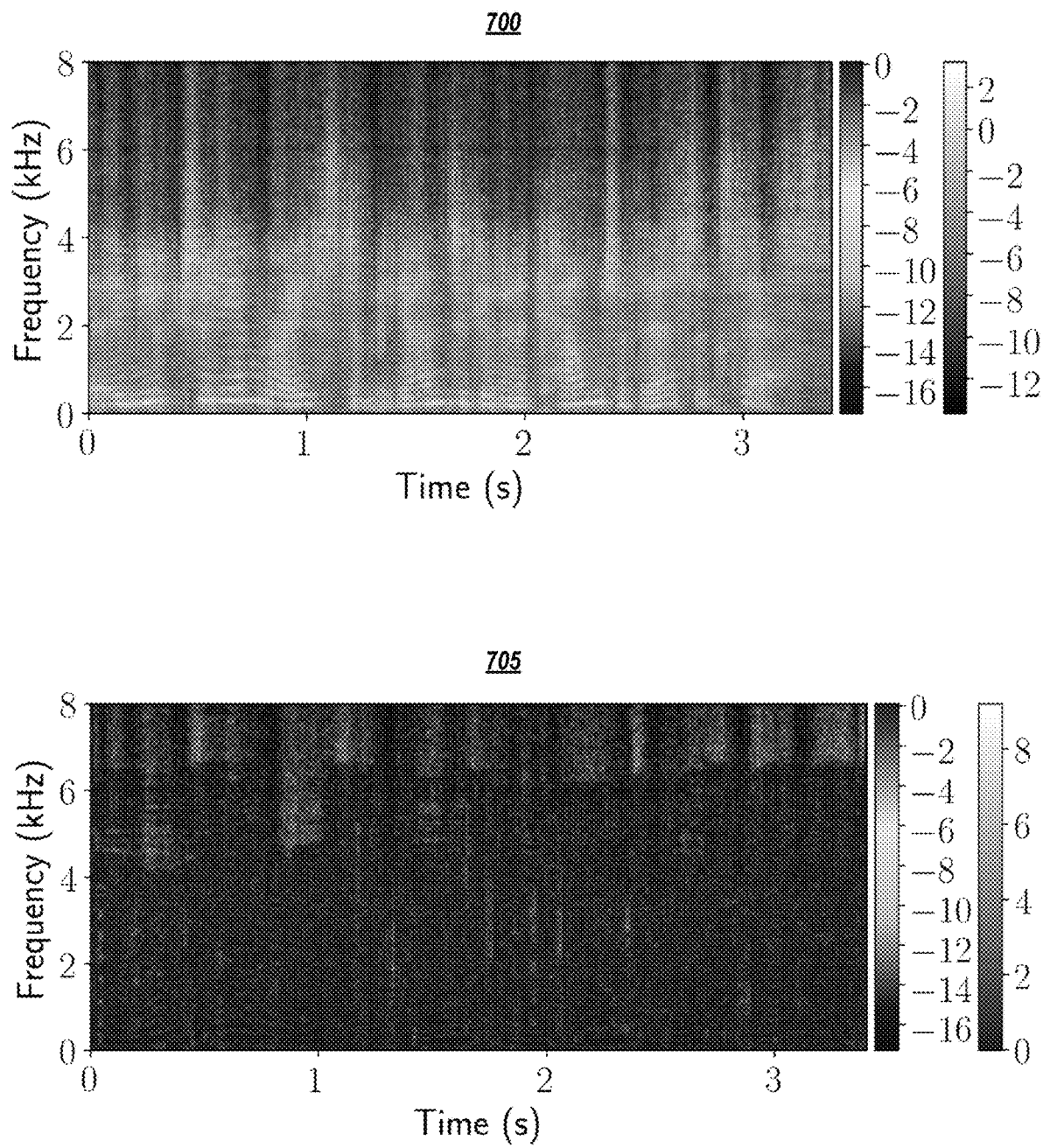

FIG. 7 shows visualization of guidance from the critic, according to embodiments of the present disclosure.

Figure 8:
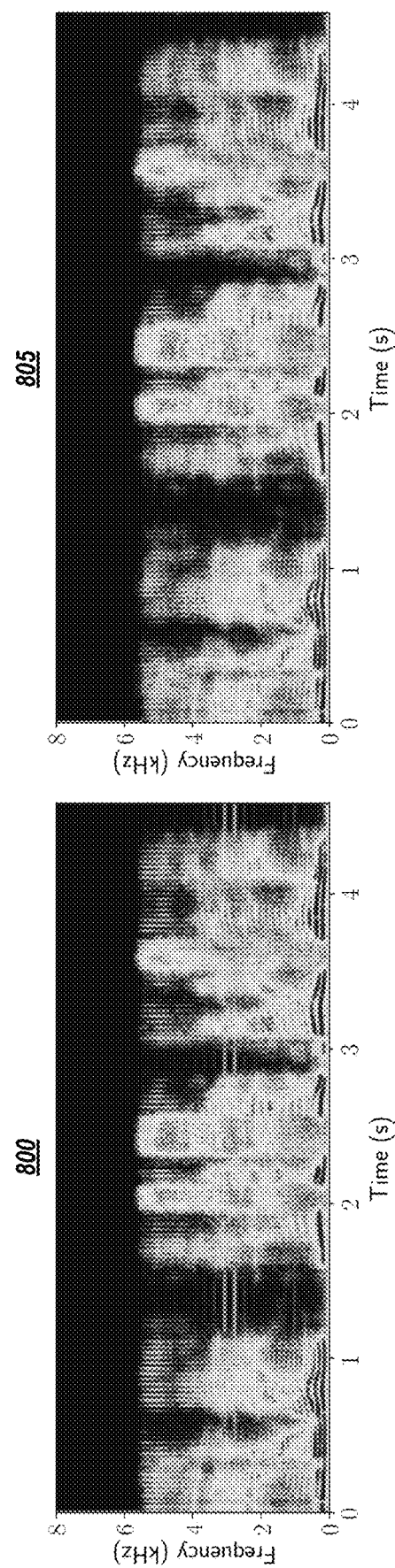

FIG. 8 shows spectrograms of generated samples without GAN (800) and with GAN training (805), according to embodiments of the present disclosure.

Figure 9:
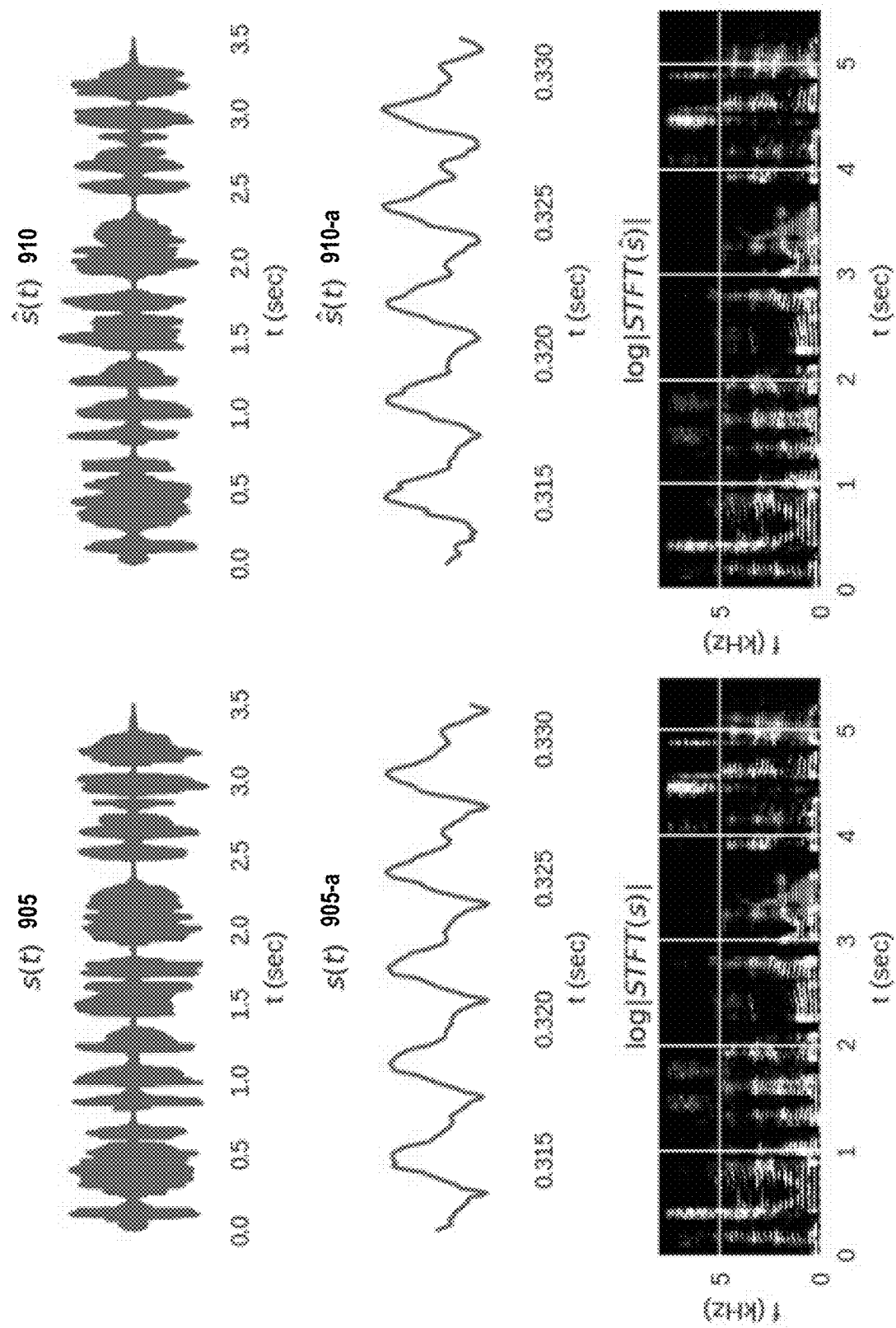

FIG. 9 depicts comparison of the waveform (entire utterance and a zoomed portion) and its spectrogram, for the ground truth (left) and MCNN-generated (right), according to embodiments of the present disclosure.

Figure 10:
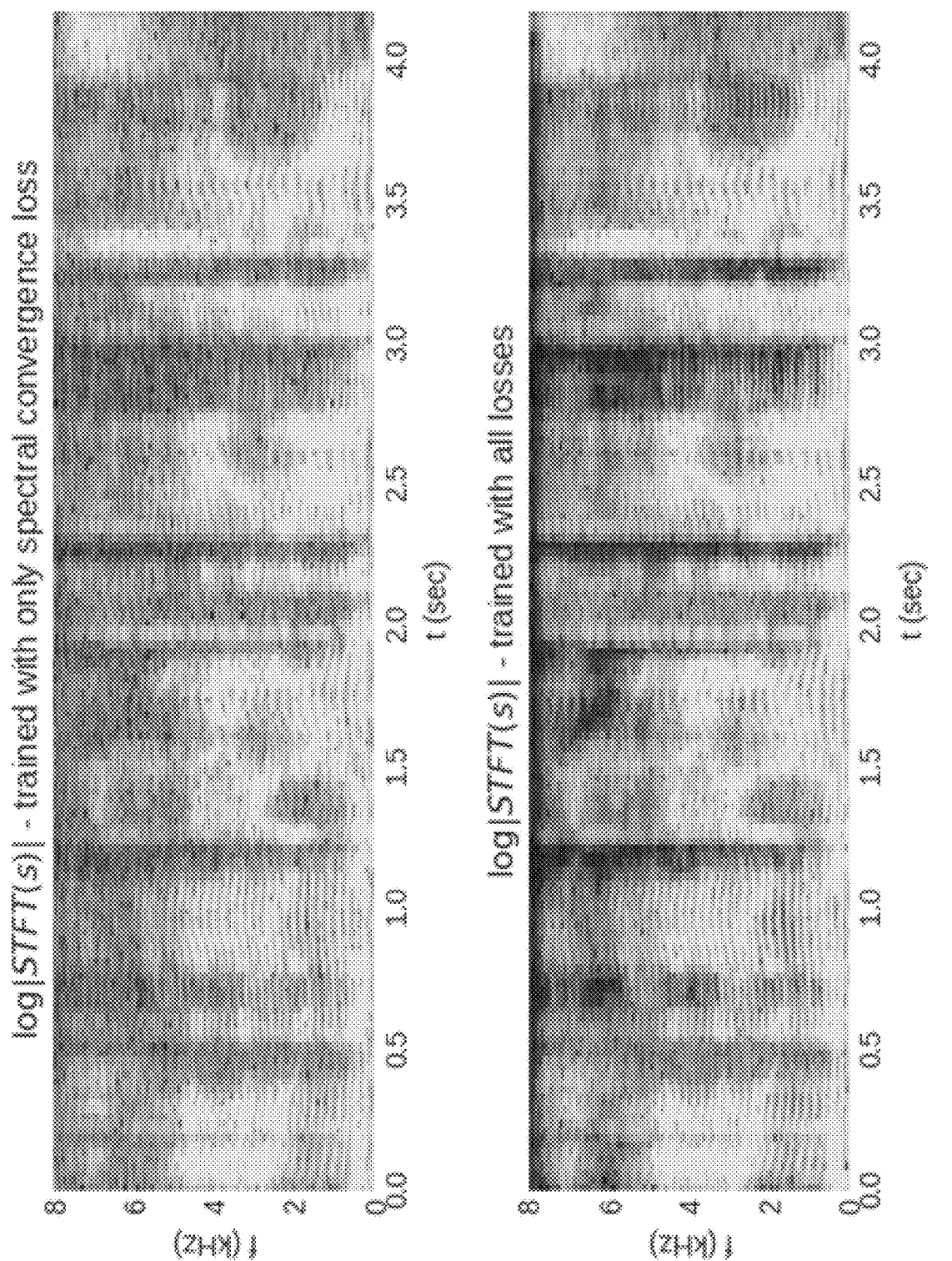

FIG. 10 depicts Log-STFT of synthesized sample for an MCNN embodiment trained with only SC loss (top) and all losses (bottom), according to embodiments of the present disclosure.

Figure 11:
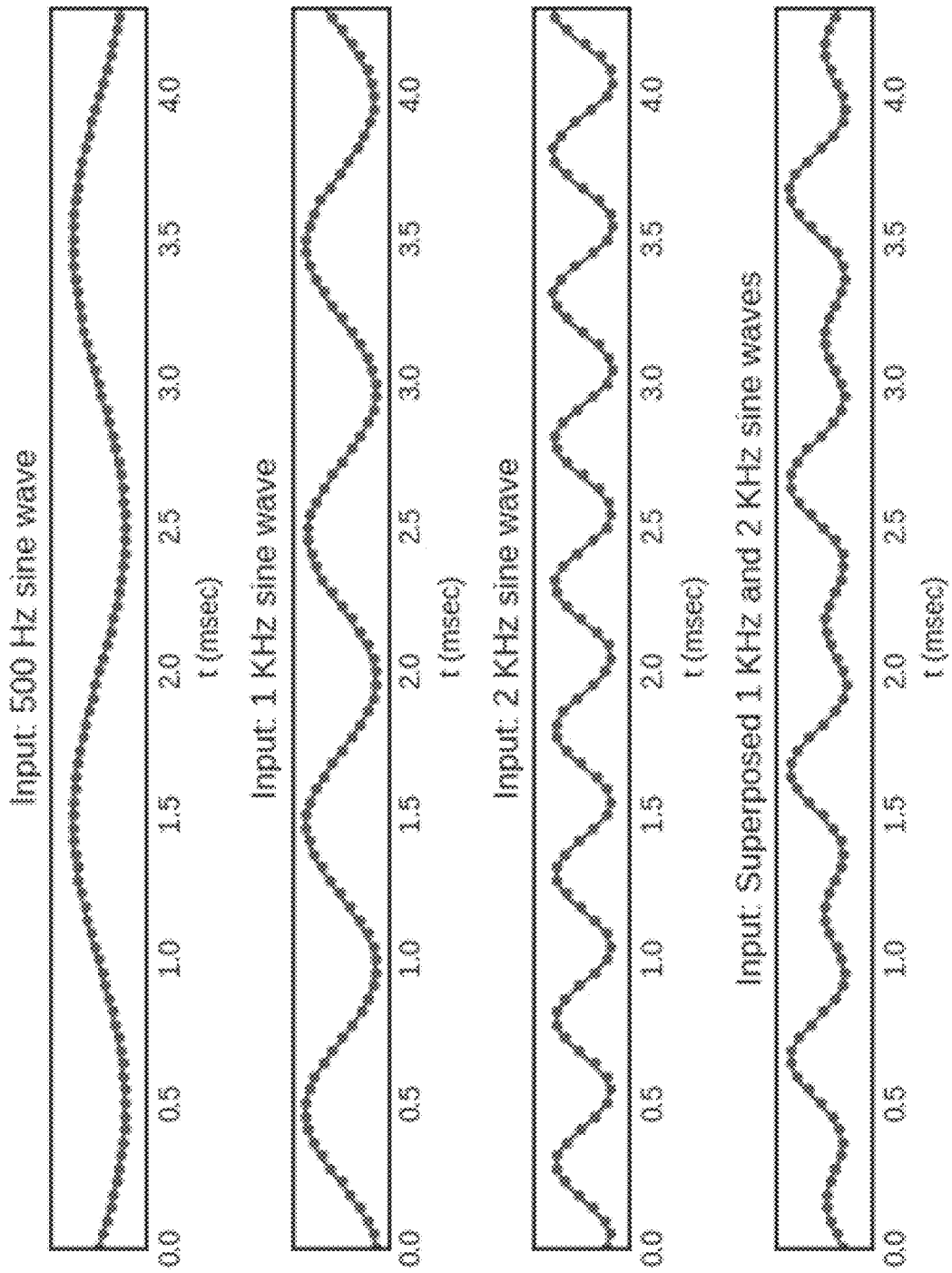

FIG. 11 depicts synthesized waveforms by an MCNN embodiment (trained on LibriSpeech), for spectrogram inputs corresponding to sinusoids at 500, 1000 and 2000 Hz, and for a spectrogram input of superposed sinusoids at 1000 and 2000 Hz, according to embodiments of the present disclosure.

Figure 12:
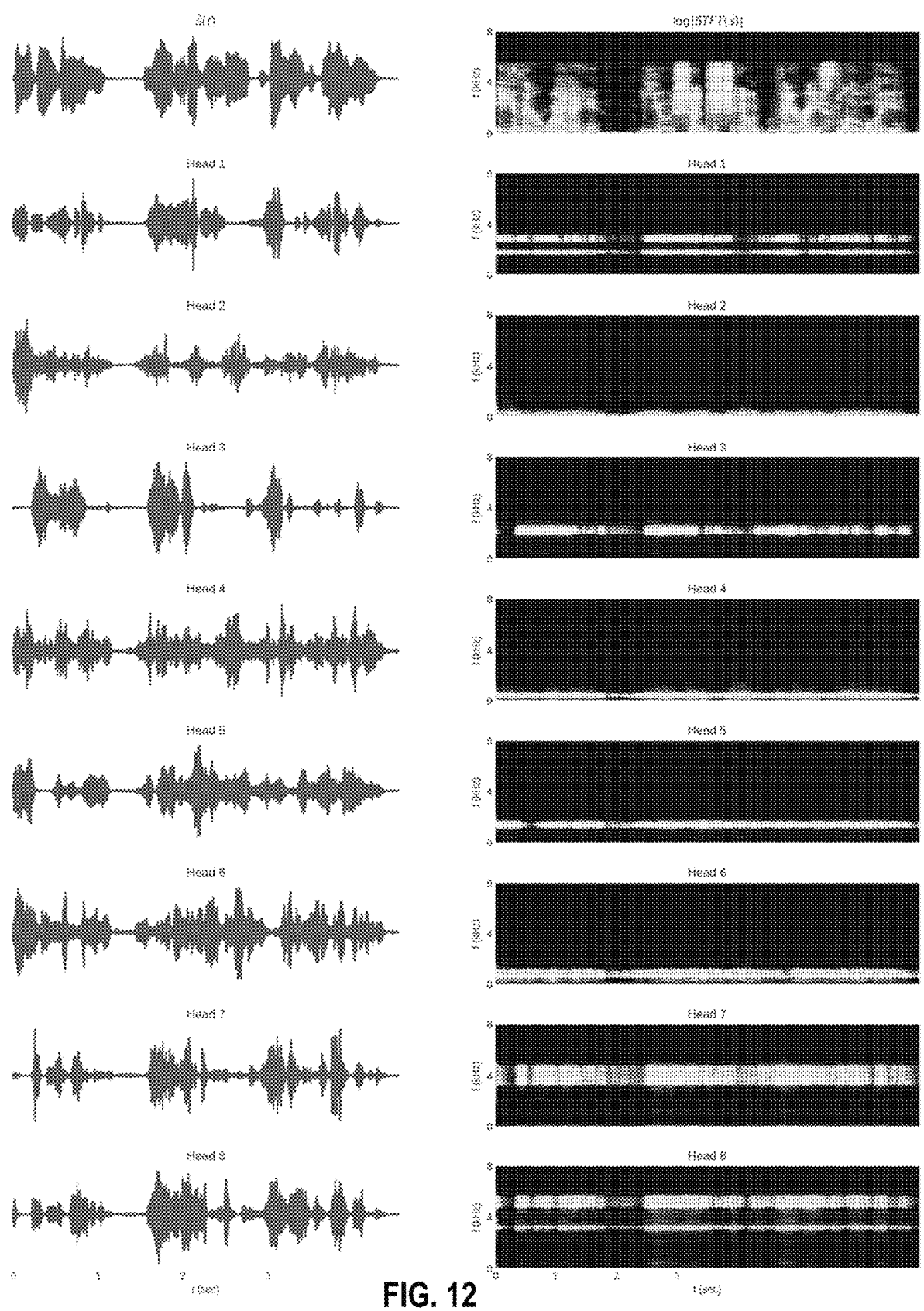

FIG. 12 shows the outputs of individual heads along with the overall waveform, according to embodiments of the present disclosure. The top row shows an example synthesized waveform and its log-STFT, and the bottom 8 rows show outputs of the waveforms of each of the constituent heads. For better visualization, waveforms are normalized in each head and small-amplitude components in STFTs are discarded after applying a threshold.

Figure 13:
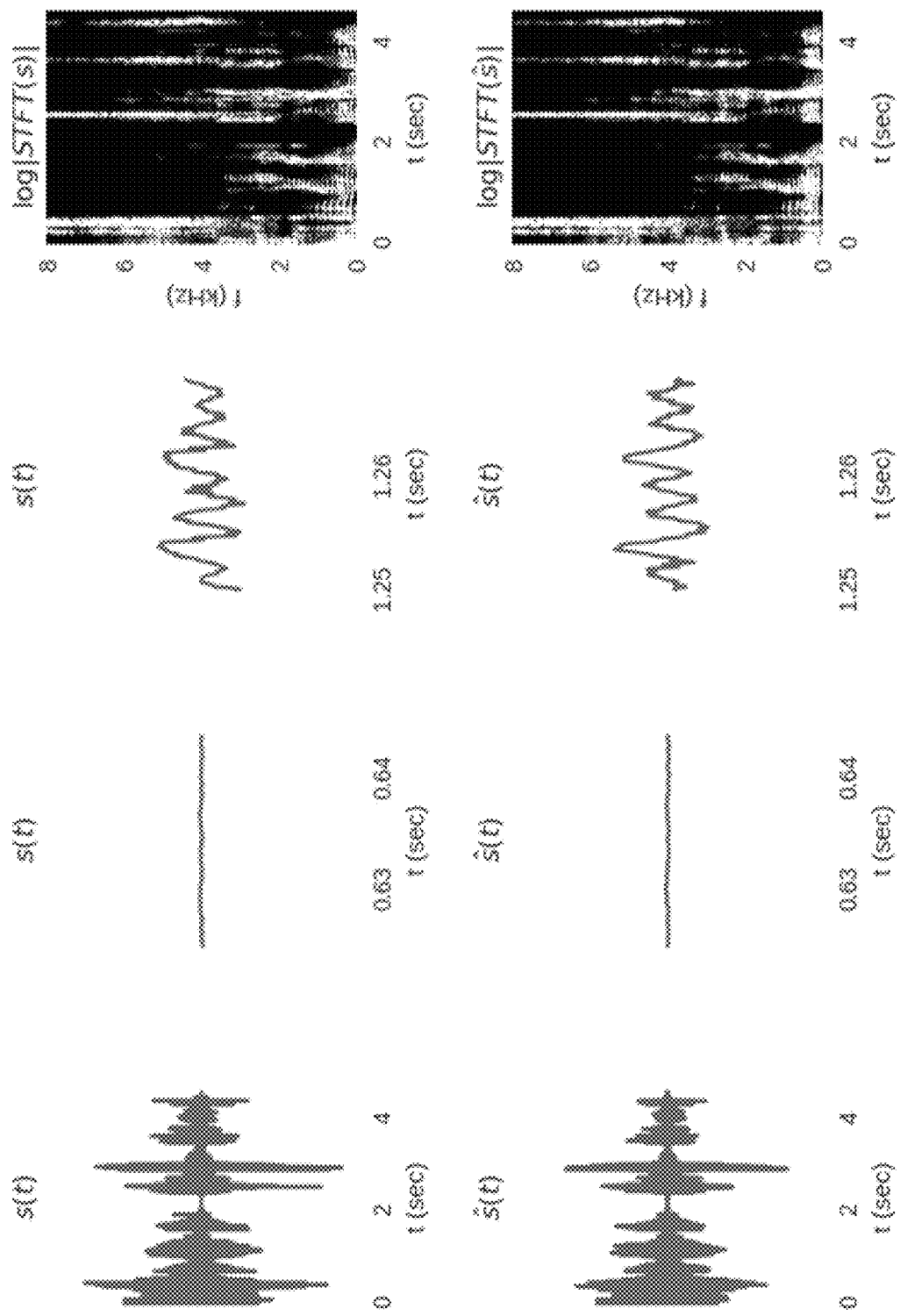

FIG. 13 depicts an example comparison of the waveform (entire utterance as well as two different zoomed portions are shown) and the spectrogram of a ground truth sample vs. its generated version using the convolutional GAN vocoder, according to embodiments of the present disclosure.

Figure 14:
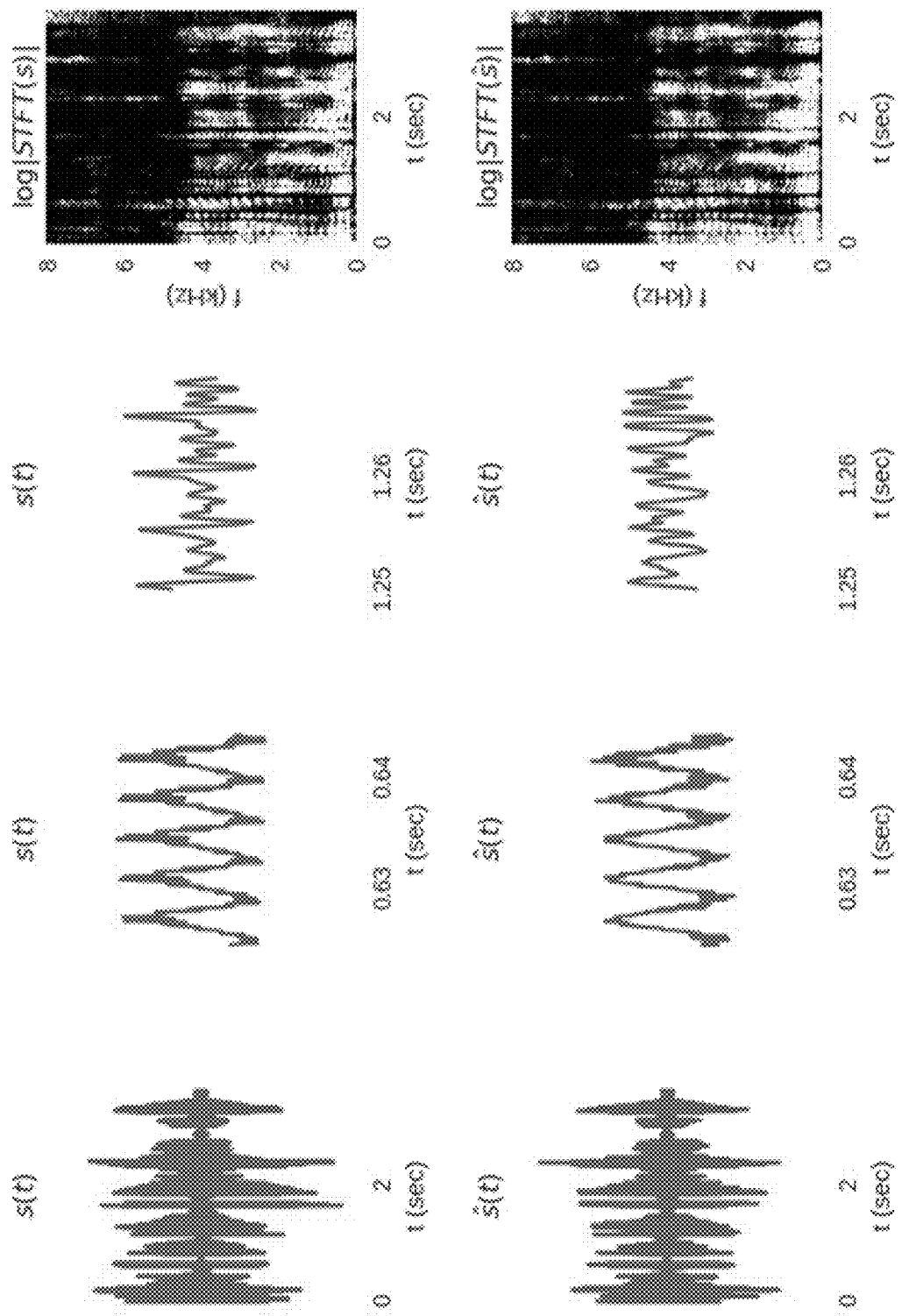

FIG. 14 depicts an example comparison of the waveform (entire utterance as well as two different zoomed portions are shown) and the spectrogram of a ground truth sample vs. its generated version using the convolutional GAN vocoder, according to embodiments of the present disclosure.

Figure 15:
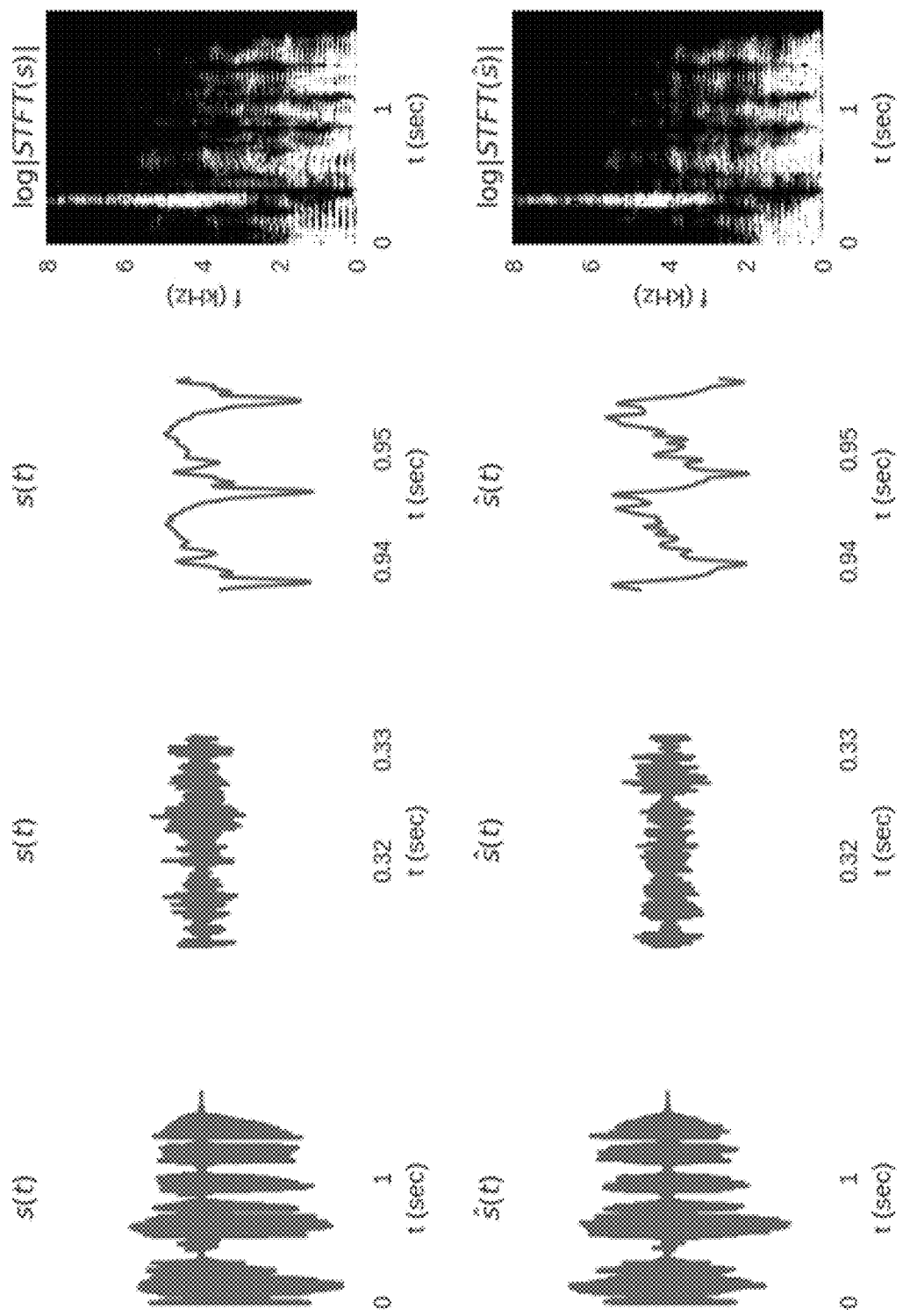

FIG. 15 depicts an example comparison of the waveform (entire utterance as well as two different zoomed portions are shown) and the spectrogram of a ground truth sample vs. its generated version using the convolutional GAN vocoder, according to embodiments of the present disclosure.

Figure 16:
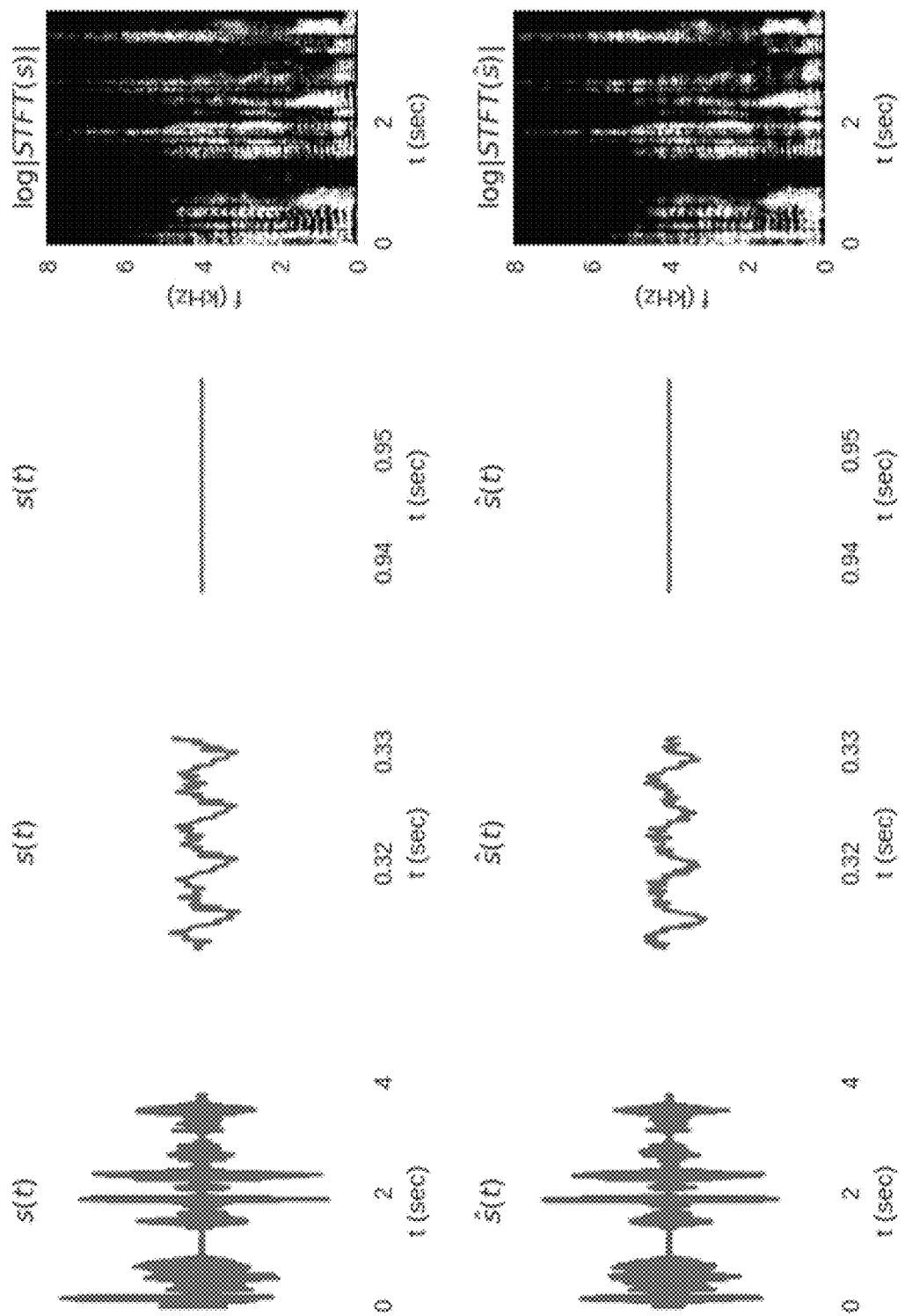

FIG. 16 depicts an example comparison of the waveform (entire utterance as well as two different zoomed portions are shown) and the spectrogram of a ground truth sample vs. its generated version using the convolutional GAN vocoder, according to embodiments of the present disclosure.

Figure 17:
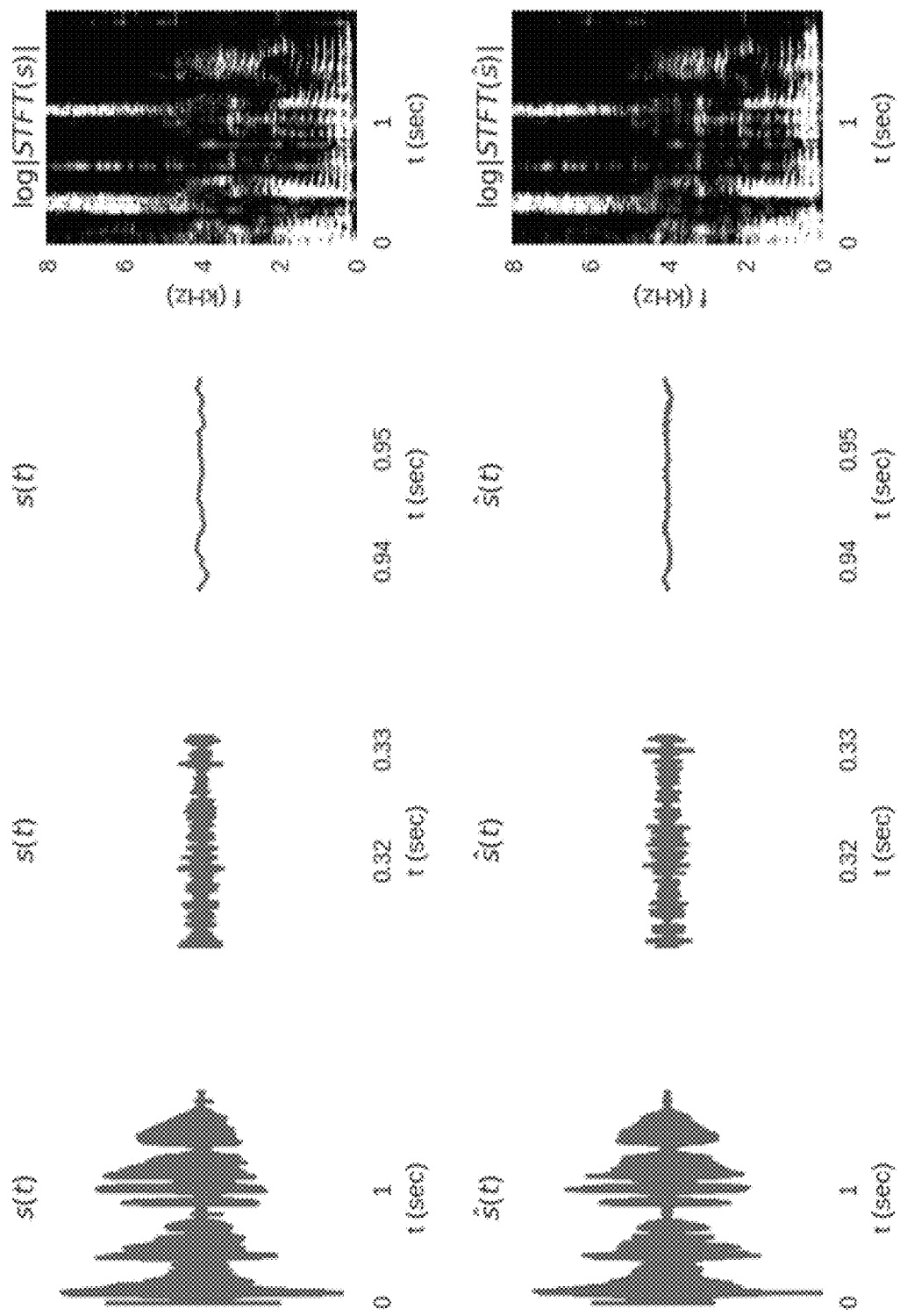

FIG. 17 depicts an example comparison of the waveform (entire utterance as well as two different zoomed portions are shown) and the spectrogram of a ground truth sample vs. its generated version using the convolutional GAN vocoder, according to embodiments of the present disclosure.

Figure 18:
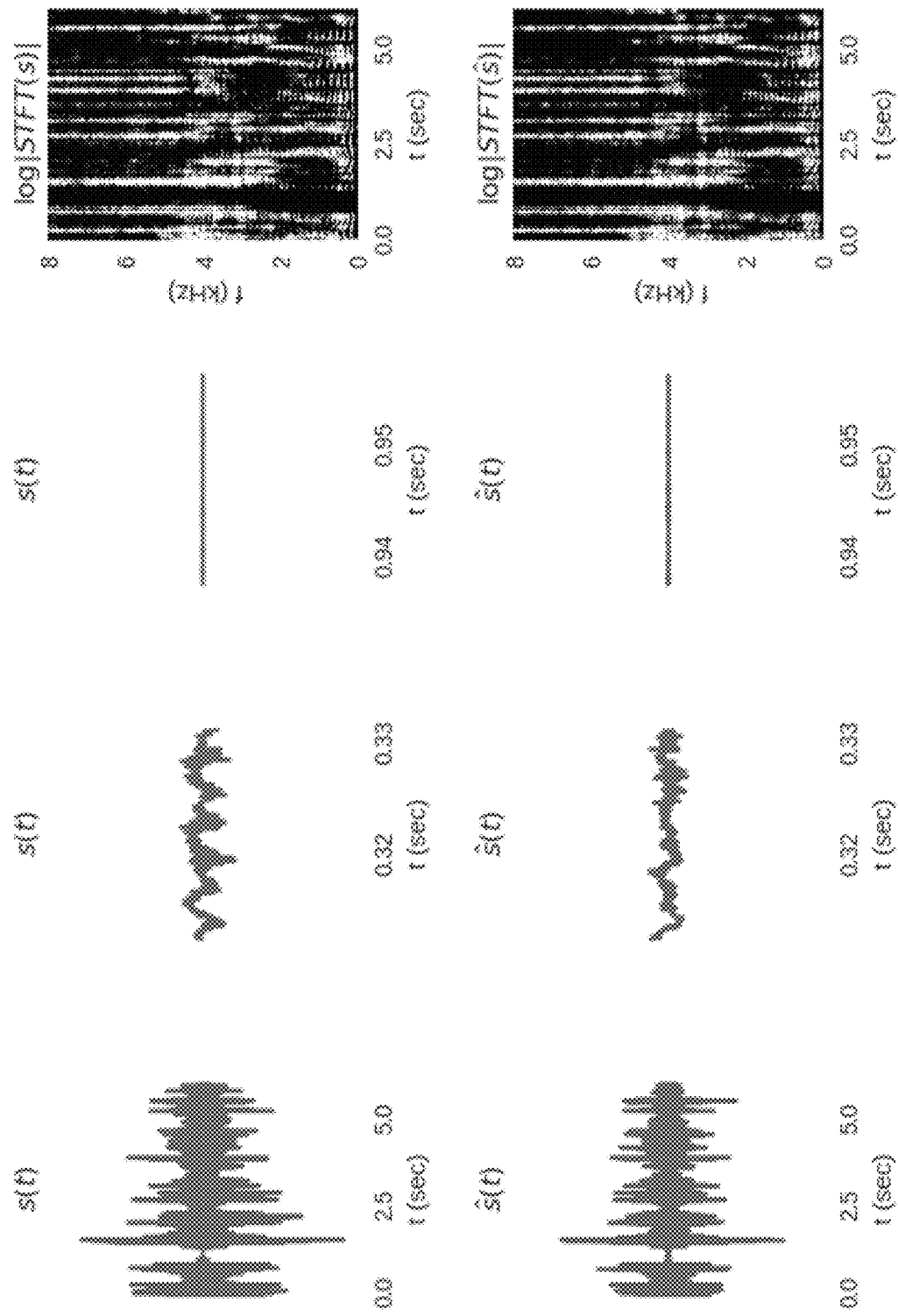

FIG. 18 depicts an example comparison of the waveform (entire utterance as well as two different zoomed portions are shown) and the spectrogram of a ground truth sample vs. its generated version using the convolutional GAN vocoder, according to embodiments of the present disclosure.

Figure 19:
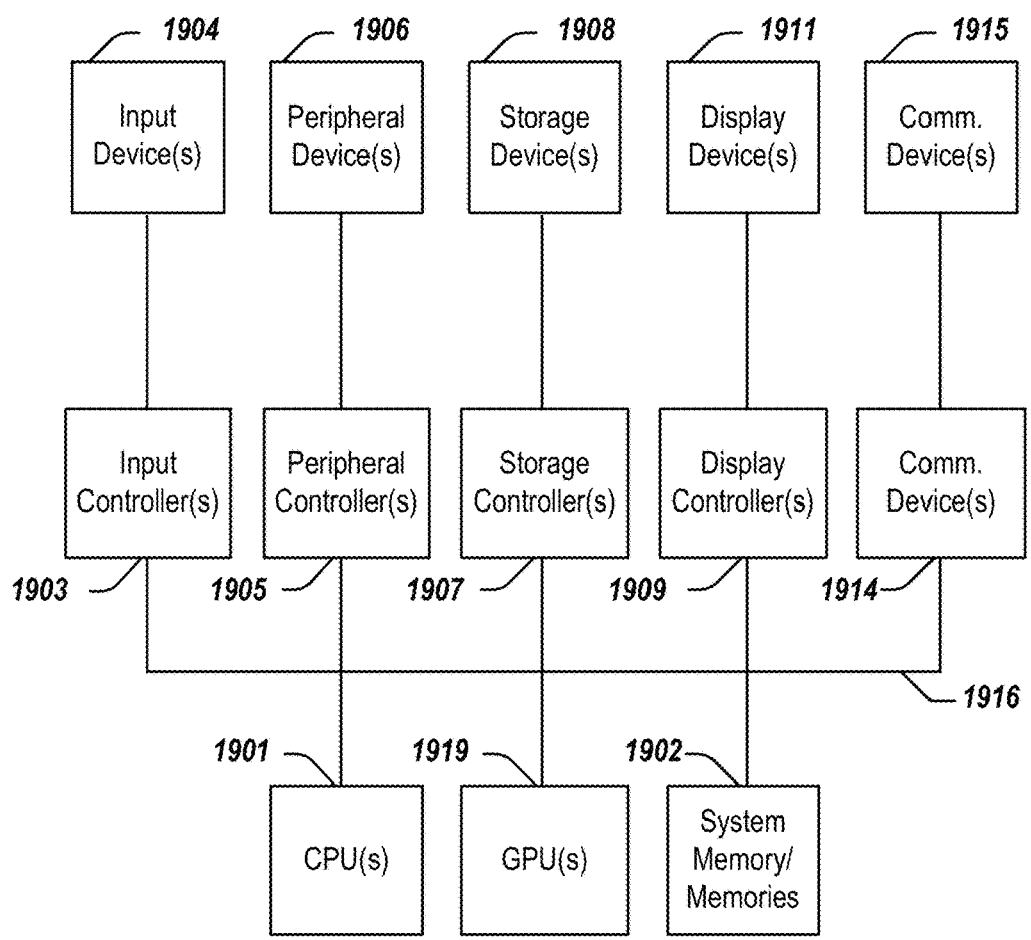

FIG. 19 depicts a simplified block diagram of a computing device/information handling system, in accordance with embodiments of the present document.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. Introduction

Recent achievements of deep neural networks in generative modeling have been striking in many applications, from synthesis of high-resolution photorealistic images to highly natural speech samples. Three perennial goals remain towards their widespread adaptation: (i) matching the distribution of generated samples with the distribution of ground truth samples; (ii) enabling high-level controls by conditioning generation on some inputs; and (iii) improving the inference speed of generative models for hardware deployment. In this patent document, these goals are a focus for the application of waveform synthesis from a spectrogram. This problem is also known as spectrogram inversion in signal processing literature.

Audio signals may be generated in an autoregressive way by their sources, such as the human vocal system. This has also motivated autoregression in generative audio modeling. Indeed, state-of-the-art results in speech synthesis employ autoregressive generation at the sample rate. Yet, these models bring challenges for deployment, as they need to run inference 16,000 or 24,000 times every second. One approach to address this challenge is to approximate an autoregressive model with an inference-efficient model. Such an approach has been implemented using distillation by learning an inverse autoregressive flow model. A fundamental question is whether autoregression is necessary at all. For example, many generative models synthesize audio by applying autoregression at the rate of spectrogram timeframes (which can be 100s of samples) and can still obtain very high-quality audio (when combined with conventional spectrogram inversion techniques—overviewed in Section B.1).

Presented herein are embodiments of a deep neural network architecture that can efficiently synthesize waveforms from spectrograms without any autoregressive computation. A goal is not necessarily to claim the state-of-the-art neural speech quality or the state-of-the-art spectrogram inversion performance in metrics like spectral convergence, but rather to demonstrate the premise of deep neural networks for this fundamental signal processing problem. Because embodiments of the architecture are trainable, they can be integrated with any generative modeling application that output spectrograms, such as text-to-speech, audio style transfer, or speech enhancement.

The proposed convolutional waveform synthesis network embodiments may be trained using a combination of audio reconstruction losses, and in embodiments, may be trained using a generative adversarial network (GAN) framework. From the GAN literature standpoint, their application to generate high-quality audio samples has been demonstrated. Previous works in GAN have already demonstrated good results in high-quality image synthesis. For audio synthesis the demonstrations so far have been limited to unconditional speech synthesis or low-quality speech synthesis from a small class, such as digits or speech enhancement, where the input already contains rich information. One of the motivations of some embodiments herein is also to push the state-of-the-art in the use of GANs for conditional audio synthesis.

B. Background

1. Spectrogram Inversion

A spectrogram contains intensity information of time-varying spectrum for a waveform, given by the squared magnitude of its short-time Fourier transform (STFT). Spectral conversion is typically applied after windowing the waveform (typically with a Hanning, Hamming, and Gaussian window). Waveform-to-spectrogram conversion is fundamentally lossy, because of the squaring operation. Spectrogram inversion has been studied widely in signal processing literature. Yet, there is no known algorithm that guarantees achievement of a globally optimal solution at a low (i.e., non-deterministic polynomial-time hard) computational complexity. A fundamental challenge is the non-convexity of the intensity constraint with an unknown phase in the frequency domain.

The most popular technique for spectrogram inversion is the Griffin-Lim (GL) algorithm. GL is based on iteratively estimating the unknown phases by repeatedly converting between frequency and time domain using the STFT and its inverse, substituting the magnitude of each frequency component to the predicted magnitude at each step. Although the simplicity of GL is appealing, the well-known drawbacks are that it is slow (typically require many sequential iterations), it is inflexible (objective function is not directly related to an objective like perceptual audio quality), and it is fixed (no trainable parameters to improve for a specific domain like human speech). To address these issues, variants of GL have been studied. A fast GL has been proposed by modifying its update step with a term that depends on the magnitude of the previous update step. Others proposed a single-pass spectrogram inversion (SPSI) algorithm, which can synthesize the waveform in a single fully-deterministic pass and can be further enhanced with extra GL iterations. SPSI estimates the instantaneous frequency of each frame by peak picking and quadratic interpolation. Another non-iterative spectrogram inversion technique has been proposed based on the direct relationship between the partial derivatives of the phase and the magnitude of the STFT with respect to the Gaussian window. The technique assumes a Gaussian window for analytical derivations but can approximate other windows, albeit at a penalty. In another approach, a convex relaxation is applied to the spectrogram inversion problem, to express it as a semidefinite program. The convergence guarantee of the convex relation is demonstrated at the expense of the increased problem dimensionality.

Recently deep neural networks have been applied to spectrogram inversion. In one or more embodiments, a variant of WaveNet architecture is used for spectrogram inversion. Embodiments of the architecture are autoregressive at the sample rate and may be implemented using stacked dilated convolution layers. In one or more embodiments, spectrogram frames are given as external conditioner at each sample.

Some applications use spectrograms with non-linear frequency scales, such as mel spectrograms. In one or more embodiments herein, a focus is on inversion of the spectrograms with linear frequency scale to address a more general problem. Neural networks to convert mel spectrogram to linear spectrogram can be based on simple architectures such as fully-connected layers.

2. Deep Neural Networks for Generative Audio Applications

Deep neural networks have recently demonstrated excellent results in generative audio applications. A major one is text-to-speech. For example, the WaveNet architecture has been proposed, which synthesizes speech in an autoregressive way conditioned on the linguistic features. WaveNet has been approximated by a parallelizable architecture learned via distillation. On the other hand, many successful approaches for text-to-speech are based on separating the problem into text-to-spectrogram (or text-to-mel spectrogram) conversion, combined with a spectrogram inversion technique. Embodiments of an attention-based sequence-to-sequence model have been used to generate mel spectrograms, with autoregression at spectrogram frame rate. Then, spectrogram inversion may be applied using the GL algorithm or WaveNet. There are also applications that directly transform input audio sample(s). One is speech enhancement, to improve the quality of distorted or noisy speech. Common approaches are based on GANs to process raw waveforms or the spectrograms. Another application is transfer of the audio style or speaker. Some have applied it via optimization of a style loss, defined between the waveforms or the spectrograms of the input and the style audio, after initializing the input with the content audio. Speaker identity modification has been demonstrated using generative model fine-tuning, or direct speaker encoding with a neural network. Overall, many deep neural network models for generative audio modeling output spectrograms, and they use a spectrogram inversion technique like GL algorithm to synthesize waveforms. Predicting a smooth and structured representation is an effective approach for neural network training since rapidly fluctuating phase (either in time or frequency domain) would make neural network training much harder, yielding worse results.

C. Convolutional Waveform Synthesis Embodiments

Assume the input spectrogram for the waveform s, $|STFT(s)|^2$, has a dimension of $T_{spec} \times F_{spec}$ and the corresponding waveform has a dimension of $T_{wave}$. The ratio $T_{wave}/T_{spec}$ may be determined by the spectrogram parameters, hop length, and the window length. Assume these parameters are known a priori.

Generating the waveform from spectrogram, a neural network should perform nonlinear upsampling in the time domain, while utilizing the spectral information. Typically, the window length is much longer than the hop length, and it can be important to process the extra information in neighboring time frames. To obtain fast inference, an aim is to obtain a neural network architecture that can achieve a high compute intensity. Compute intensity may be defined as the average number of operations per data access. Modern multi-core processors favor models with high compute intensity, which can be achieved by repeatedly-applied computations with the same kernel.

1. Single Head Convolutional Neural Network Embodiments

Figure 1:
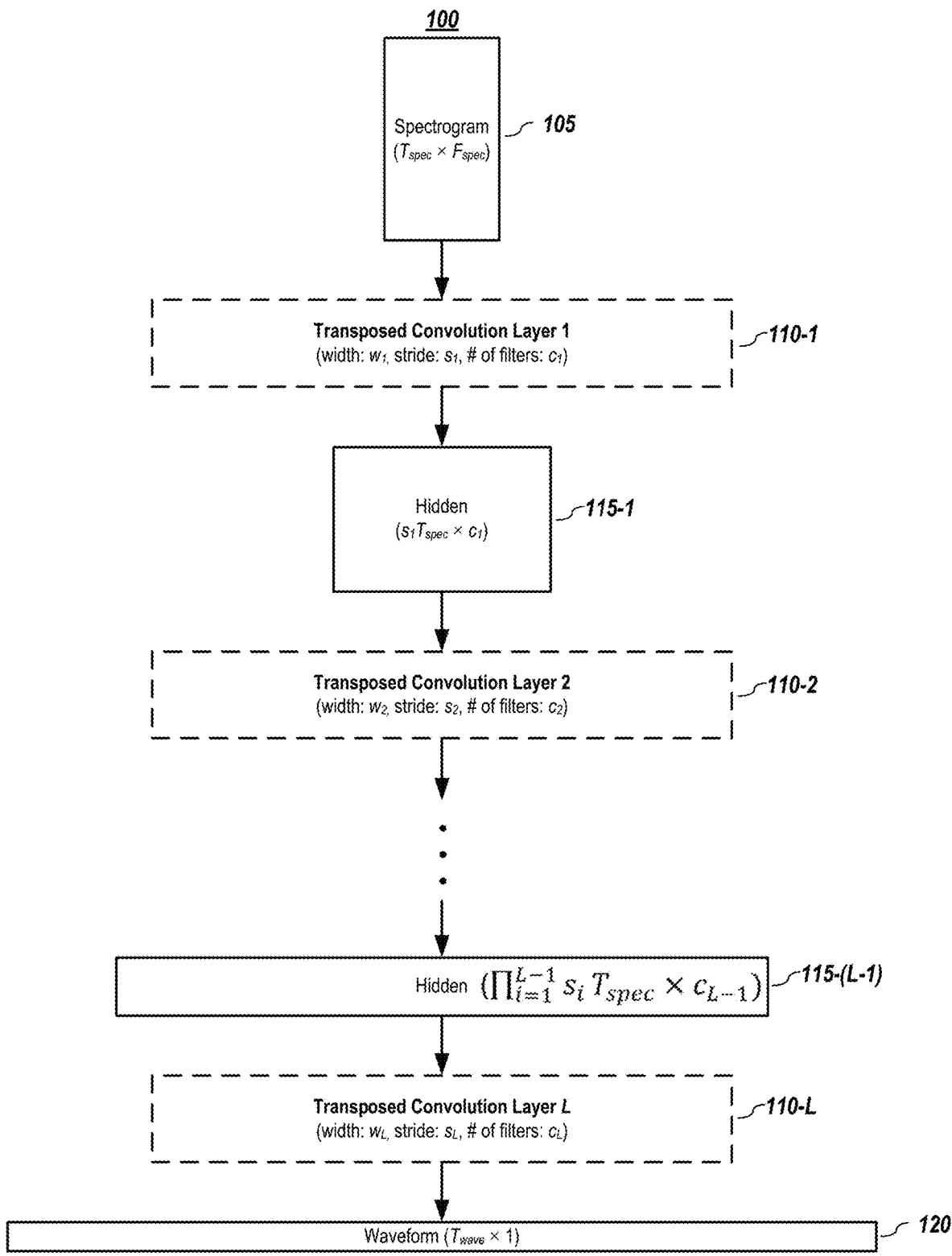

Based on this motivation, a focus is on a vocoder architecture embodiment that comprises L transposed convolution layers, as shown in FIG. 1. FIG. 1 shows a graphical depiction of an architecture of a generative model, according to embodiments of the present disclosure.

In one or more embodiments, each transposed convolution layer $110$-$x$ comprises a one-dimensional (1-D) temporal convolution, followed by a softsign nonlinearity (not depicted). A softsign nonlinearity has lower implementation complexity and more gradient flow than other saturating nonlinearities. For the $l^{th}$ layer, $w_l$ is the filter width, $s_l$ is the stride, and $c_l$ is the number of output filters (channels). Striding in convolutions determines the amount of temporal upsampling, and they may be chosen to satisfy $\Pi_{l=1}^{L} s_l \cdot T_{spec} = T_{wave}$. Filter widths control the amount of local neighborhood information used while upsampling. The number of filters determine the number of frequency channels in the processed representation, and it may be gradually reduced to 1 to produce the time-domain waveform $120$. Scaling with a trainable scalar may be used at the last layer to match the scaling of inverse STFT operation.

2. Multi-Head Convolutional Neural Networks (MCNN) Embodiments

It should be noted that two or more heads may be combined into a multi-head convolutional neural network (MCNN) architecture. In one or more embodiments, MCNN comprises multiple heads that use the same types of layers but with different weights and initialization, and they learn to cooperate as a form of ensemble learning. By using multiple heads, each model is allowed to allocate different upsampling kernels to different components of the waveform which is analyzed further in Appendix B.

Figure 2:
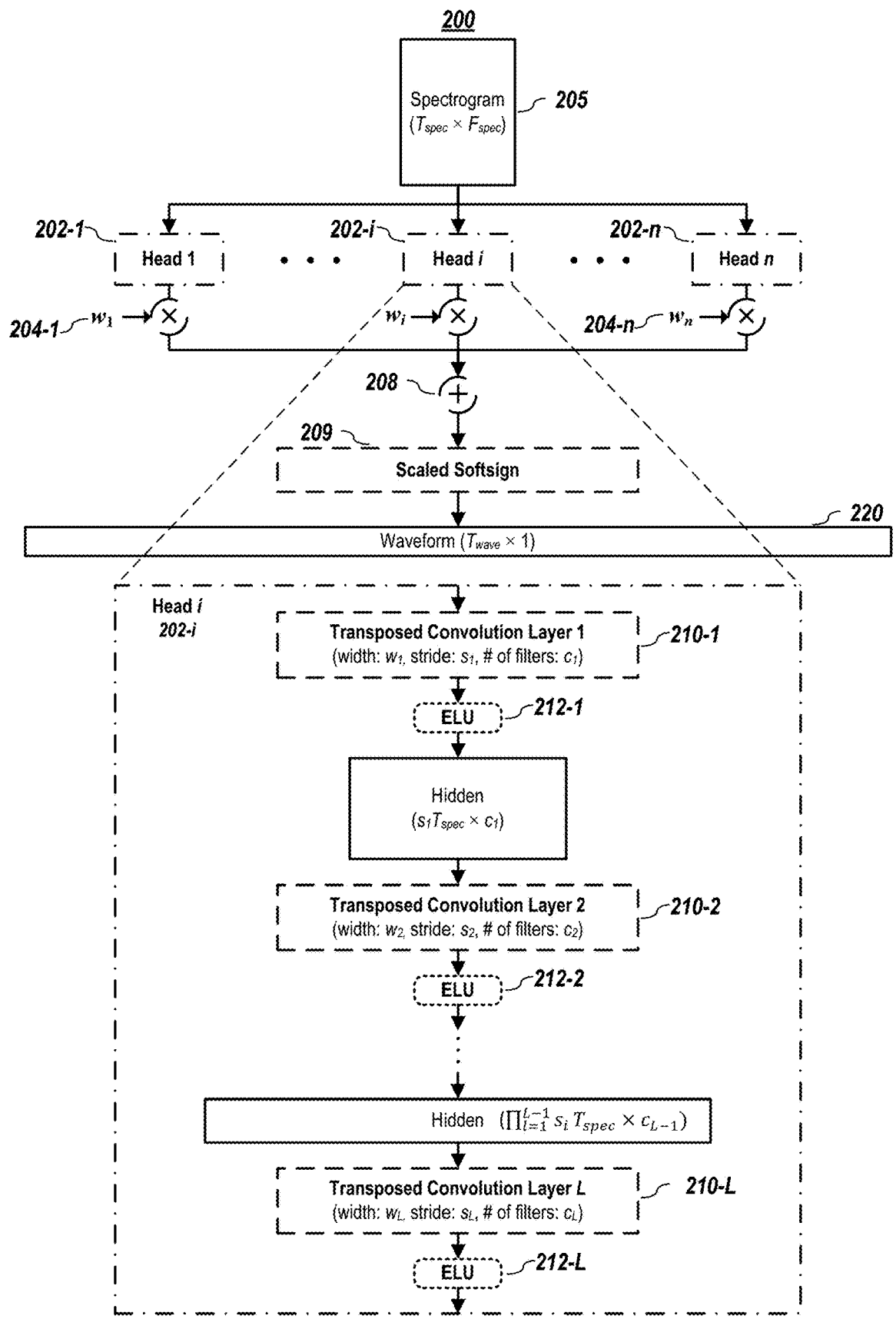
FIG. 2 graphically depicts a multi-head convolution neural network (MCNN) architecture for spectrogram inversion, according to embodiments of the present disclosure.

FIG. 2 graphically depicts a multi-head convolution neural network (MCNN) architecture 200 for spectrogram inversion, according to embodiments of the present disclosure. In one or more embodiments, each head may be configured as described above or as depicted in FIG. 2 as the exploded view of example head, Head i $202$-$i$. Like the head depicted in FIG. 1, each head comprises L transposed convolution layers $210$-$x$, as shown in FIG. 2. Each transposed convolution layer may comprise a 1-D temporal convolution operation, followed by an exponential linear unit (ELU) $212$-$x$. It should be noted that other nonlinearities may be used, such as ReLU and softsign, but empirically ELU produced superior audio quality. As with the single head embodiment, for the $l^{th}$ layer, $w_l$ is the filter width, $s_l$ is the stride, and $c_l$ is the number of output filters (channels); striding in convolutions determines the amount of temporal upsampling, and they may be chosen to satisfy $\Pi_{l=1}^{L} s_l \cdot T_{spec} = T_{wave}$. Filter widths control the amount of local neighborhood information used while upsampling. The number of filters determine the number of frequency channels in the processed representation, and it may be gradually reduced to 1 to produce the time-domain waveform.

In one or more embodiments, as the convolutional filters are shared in channel dimension for different timesteps, an MCNN embodiment can receive a spectrogram input 205 with an arbitrary duration.

In one or more embodiments, a trainable scalar $204$-$x$ is multiplied to the output of each head $202$-$x$ to match the overall scaling of inverse STFT operation and to determine the relative weights of different heads.

Lastly, in one or more embodiments, all head outputs are summed 208 and passed through a scaled softsign nonlinearity 209 (e.g., $$f(x) = \frac{ax}{(1+|bx|)},$$

where a and b are trainable scalars) to bound the output waveform 220.

D. Audio Reconstruction Losses

A fundamental challenge for generative modeling is the choice of loss functions that are highly correlated to the perceptual quality of the outputs. In one or more embodiments, a linear combination of one or more of the below loss terms between the estimated signal $\hat{s}$ and the ground truth signal s may be used:

(i) Spectral Convergence (SC):

In one or more embodiments, the spectral convergence loss may be formulated as:

$$C(s,\hat{s}) = \||STFT(s)| - |STFT(\hat{s})|\|_F / \||STFT(s)|\|_F, \quad (1)$$

where $\|\cdot\|_F$ is the Frobenius norm over time and frequency. Spectral convergence loss emphasizes highly on the large spectral components, which can be critical especially in early phases of training.

(ii) Log-Scale STFT-Magnitude Loss:

In one or more embodiments, the log-scale STFT-magnitude loss may be formulated as:

$$LM(s,\hat{s}) = (1+M(f))\|\log(|STFT(s)|+\in) - \log(|STFT(\hat{s})|+\in)\|_1, \quad (2a)$$

where $\|\cdot\|_1$ is the $L^1$ norm and $\in$ is a small number. M(f) is a band-pass filter to control the focus on the frequencies important to human hearing (it may simply be assumed as an ideal bandpass filter with a passband of [300, 3500] Hz, and its amplitude is chosen empirically). A goal with the log-scale STFT-magnitude loss is to accurately fit the details given by the small amplitudes (as opposed to the spectral convergence), which tends to be more important towards the later phases of training.

In one or more embodiments, the log-scale STFT-magnitude loss may also be formulated as:

$$LM(s,\hat{s}) = \|\log(|STFT(s)|+\in) - \log(|STFT(\hat{s})|+\in)\|_1, \quad (2b)$$

(iii) Instantaneous Frequency Loss:

In one or more embodiments, the instantaneous frequency loss may also be formulated as:

$$IF(s, \hat{s}) = \left\| \frac{\partial}{\partial t}\phi(STFT(s)) - \frac{\partial}{\partial t}\phi(STFT(\hat{s})) \right\|_1, \quad (3)$$

where $\phi(\cdot)$ is the phase argument function. The time derivative $$\frac{\partial}{\partial t}$$

is estimated with finite difference $$\frac{\partial f}{\partial t} = \frac{f(t+\Delta t) - f(t)}{\Delta t}.$$

Spectral phase is highly unstructured along either time or frequency domain, so fitting raw phase values is very challenging and does not improve training. Instead, instantaneous frequency is a smoother phase-dependent metric, which can be more accurately fit while training.

(iv) Weighted Phase Loss:

In one or more embodiments, the weighted phase loss may be formulated as:

$$P(s,\hat{s}) = \||STFT(s)\|STFT(\hat{s})| - \Re\{STFT(s)\}\Re\{STFT(\hat{s})\} - \Im\{STFT(s)\}\Im\{STFT(\hat{s})\}\| \quad (4a)$$

where $\Re$ is the real part and $\Im$ is the imaginary part.

Alternatively, in one or more embodiments, the weighted phase loss may be formulated as:

$$P(s,\hat{s}) = \||STFT(s)|\odot|STFT(\hat{s})| - \Re\{STFT(s)\}\odot\Re\{STFT(\hat{s})\} - \Im\{STFT(s)\}\odot\Im\{STFT(\hat{s})\}\|_1, \quad (4b)$$

where $\Re$ is the real part, $\Im$ is the imaginary part, and $\odot$ is the element-wise product.

When a circular normal distribution is assumed for the phase, the log-likelihood loss is proportional to $L(s, \hat{s}) = \cos(\pi(\phi(STFT(s)) - \phi(STFT(\hat{s}))))$. Correspondingly, a loss may be defined as $W(s, \hat{s}) = 1 - L(s, \hat{s})$, which is minimized ($W(s, \hat{s})=0$) when $\phi(STFT(s)) = \phi(STFT(\hat{s}))$. To focus on the high-amplitude components more and for better numerical stability, one may further modify $W(s, \hat{s})$ by scaling with $|STFT(s)|\odot|STFT(\hat{s})|$, which yields Eq. 4b after $L^1$ norm. In one or more embodiments, the loss is minimized when the phases of the STFTs match for the ground-truth and generated waveforms.

(v) Waveform Envelope Loss:

$$WE(s,\hat{s}) = \Sigma_{n=1}^{N} \||s|^2 * g_n - |\hat{s}|^2 * g_n\|_1, \quad (5)$$

where * is the convolution operator and $g_n$ is the impulse response of a low-pass filter. N Gaussian filters (cutoff frequencies are chosen to average over 10s to 100s of samples) are considered. The envelope of a waveform determines the sound's unique individual quality and how it is interpreted. In Eq. 5, one of the simplest waveform envelope extraction approaches was used, to map the envelope between the ground truth and generated waveforms.

As noted above, in one or more embodiments, a combination of one or more of the loss terms between the estimated signal $\hat{s}$ and the ground truth signal s may be used. In one or more embodiments, the combination may be a linear combination, which may comprise a weighed linear combination.

E. Generative Adversarial Network (GAN) Framework Embodiments

Distance-based metrics learn conditional expectation or other central properties, but marginalization over a latent phase structure may yield unrealistic samples. In one or more embodiments, a GAN framework may be used to ensure that the distribution of generated audio matches the ground-truth distribution. Many earlier variants of GAN are challenging to train and sensitive to optimization and architectural choices. In one or more embodiments herein, Cramer GAN is used for its general robustness. Also, it does not suffer from biased gradients, and training converges fairly well even with a single critic update per generator step unlike other similar families like Wasserstein GAN.

In one or more embodiments, the original Cramer GAN algorithm was used unaltered. A fundamental difference is the type of the input and the corresponding critic architecture required. For temporal processing, the critic slides over the input waveform and emits transformed features. The final scalar score is computed by taking the temporal average of such features and measuring the energy distance between these pooled vectors from the ground-truth and predicted waveforms. Embodiments do not use prior vectors as they were found to be not useful in improving perceptual quality of the generated audios. As for the critic architecture, one or more embodiments use a stack of 1-D convolution, layer normalization, and leaky ReLU. The 1-D convolution in the lth layer have $w_l$ as the filter width, $s_l$ as the stride, and $c_l$ as the number of output filters (channels). The critic architecture can be thought of as a mirror over the upsampling operations in waveform synthesis. Different striding and filter sizes from those of the vocoder yield the receptive fields to not align exactly. The gradient penalty term and the generation of multiple samples in Cramer GAN add considerable computational and memory overhead at train time, but this does not affect inference efficiency.

It shall be noted that while a Cramer GAN is used for one or more embodiments, other relativistic GANs may be also be employed.

F. General Method Embodiment

FIG. 3 depicts a general methodology for training a convolution neural network (CNN) that may be used to generate a synthesized waveform from an input spectrogram, according to embodiments of the present disclosure. In one or more embodiments, a method for spectrogram inversion comprises inputting (305) an input spectrogram comprising a number of frequency channels into a convolution neural network (CNN) comprising at least one head. It shall be noted that the input spectrogram may initially be a mel-spectrogram, which is converted to a spectrogram. As noted above, in one or more embodiments, a head comprises a set of transposed convolution layers in which each transpose convolution layer is separated by a nonlinearity operation and the set of transposed convolution layers reduce the number of frequency channels of the spectrogram to one channel after a last transposed convolution layer.

If the CNN system includes only a single head, then its output is used. If the CNN system has more than one head, the outputs from each head are combined (310). In one or more embodiments, a weighted combination of the output of each head may be obtained by weighting the output by a value for each head output, which weighting value may also be trainable.

Whether a single output or a weighted combination output, a scaled function, such as a scaled softsign, may be applied (315) to the output to obtain a final output waveform. The final output waveform and its corresponding ground truth waveform are used to compute a loss. In one or more embodiments, a combined loss function may be employed (325) comprising at least one or more loss components selected from spectral convergence loss, log-scale STFT-magnitude loss, instantaneous frequency loss, weighted phase loss, and waveform envelope loss. In one or more embodiments, a loss from a GAN may also be included. Finally, the loss is used to update (325) the CNN through backpropagation.

For a MCNN embodiment, training may include initializing the plurality of heads with at least some different parameters to allow the CNN system to focus on different aspects of the spectrogram.

It should be noted that the training dataset may be a large-scale multi-speaker dataset, but the trained CNN may be applied to an unseen speaker to generate the waveform. Alternatively, the CNN may be trained using a single speaker dataset.

FIG. 4 depicts a general methodology for using a trained convolution neural network (CNN) to generate a synthesized waveform from an input spectrogram, according to embodiments of the present disclosure. In one or more embodiments, an input spectrogram comprising a number of frequency channels is input (405) into a convolution neural network (CNN) comprising at least one head. It shall be noted that the input spectrogram may initially be a mel-spectrogram, which is converted to a spectrogram.

If the CNN system includes only a single head, then its output is obtained. If the CNN system has more than one head, the outputs from each head are combined (410). In one or more embodiments, a weighted combination of the output of each head may be obtained by weighting the output by a value for each head output.

In one or more embodiments, whether a single output or a weighted combination output, a scaled function, such as a scaled softsign, may be applied (415) to the output to obtain a final output waveform.

G. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

1. Single Head CNN Embodiments a) Experimental Setup

The LibriSpeech dataset (V. Panayotov, G. Chen, D. Povey, and S. Khudanpur, "Librispeech: an ASR corpus based on public domain audio books," in *Acoustics, Speech and Signal Processing (ICASSP)*, 2015 *IEEE International Conference*, pages 5206-5210. IEEE, 2015) for training. It is a dataset for automatic speech recognition containing 960 hours of public-domain audiobooks from 2484 speakers sampled at 16 kHz, and its audio quality is lower compared to speech synthesis datasets. In embodiments, a preprocessing pipeline, comprising segmentation and denoising, was used that is the same as or similar to that in W. Ping, K. Peng, A. Gibiansky, S. Ö. Arik, A. Kannan, S. Narang, J. Raiman, and J. Miller, "Deep Voice 3: 2000-speaker neural text-to-speech," available at arXiv: 1710.07654, 2017," and which is also disclosed in commonly-assigned U.S. Pat. No. 10,796,686, issued on 6 Oct. 2020, entitled "SYSTEMS AND METHODS FOR NEURAL TEXT-TO-SPEECH CONVOLUTIONAL SEQUENCE LEARNING," and U.S. Prov. Pat. App. No. 62/574,382, filed on 19 Oct. 2017, entitled "SYSTEMS AND METHODS FOR NEURAL TEXT-TO-SPEECH USING CONVOLUTIONAL SEQUENCE LEARNING," and listing Sercan Ö. Arik, Wei Ping, Kainan Peng, Sharan Narang, Ajay Kannan, Andrew Gibiansky, Jonathan Raiman, and John Miller as inventors (which disclosures may be generally referred to, for convenience, as "Deep Voice 3" or "DV3"). Each of the aforementioned documents are incorporated by reference herein in its entirety.

As the spectrogram parameters, a hop length of 400, a window length of 1600, and a fast Fourier transform (FFT) size of 4096 were assumed. These are typical values for audio applications. The vocoder architecture had 6 transposed convolution layers, with $(s_1, w_1, c_1)=(5, 9, 1024)$, $(s_2, w_2, c_2)=(2, 3, 1024)$, $(s_3, w_3, c_3)=(2, 3, 256)$, $(s_4, w_4, c_4)=(5, 9, 128)$, $(s_5, w_5, c_5)=(2, 3, 32)$, and $(s_6, w_6, c_6)=(2, 3, 1024)$. The critic architecture had 11 convolution layers with $(s_1, w_1, c_1)=(5, 2, 32)$, $(s_2, w_2, c_2)=(5, 2, 64)$, $(s_3, w_3, c_3)=(5, 2, 64)$, $(s_4, w_4, c_4)=(5, 2, 128)$, $(s_5, w_5, c_5)=(5, 2, 128)$, $(s_6, w_6, c_6)=(3, 2, 256)$, $(s_7, w_7, c_7)=(3, 2, 256)$, $(s_8, w_8, c_8)=(3, 2, 512)$, $(s_9, w_9, c_9)=(2, 2, 512)$, $(s_{10}, w_{10}, c_{10})=(2, 2, 1024)$, and $(s_{11}, w_{11}, c_{11})=(1, 2, 1024)$. The coefficients of the loss functions presented in Section D were chosen as 1, 5, 10, 1, and 500, respectively (optimized for the audio quality by employing a random grid search—the gradient contributions of different losses have a similar order of magnitude), and the coefficient of the Cramer GAN loss was chosen as 100. The tested embodiment model was trained using Adam optimizer, applying consecutive update steps to the vocoder and the critic. For vocoder, the learning rate was 0.0006, with annealing applied every 5000 iterations with a rate of 0.95. For critic, the learning rate was 0.0003. Both vocoder and critic used a batch size of 16. The model was trained for ~800k iterations.

The results were compared to the following spectrogram inversion methods:

(i) GL: The standard implementation from D. Griffin and J. Lim, "Signal estimation from modified short-time fourier transform," in *IEEE Transactions on Acoustics, Speech, and Signal Processing*, 32(2):236-243, April 1984, was used using 3 and 50 iterations.

(ii) SPSI: The implementation from G. T. Beauregard, M. Harish, and L. Wyse, "Single pass spectrogram inversion," in 2015 *IEEE International Conference on Digital Signal Processing (DSP)*, pages 427-431, July 2015, was used. On top of the regular single pass spectrogram inversion (SPSI), cases were also considered when it was further refined with 3 and 50 extra GL iterations.

(iii) WaveNet: The WaveNet architecture from S. Ö. Arik, G. F. Diamos, A. Gibiansky, J. Miller, K. Peng, W. Ping, J. Raiman, and Y. Zhou, "Deep Voice 2: Multi-speaker neural text-to-speech," available at arXiv: 1705.08947, 2017, and also disclosed in commonly-assigned U.S. Pat. No. 10,896, 669, issued on 19 Jan. 2021, entitled "SYSTEMS AND METHODS FOR MULTI-SPEAKER NEURAL TEXT-TO- SPEECH," and U.S. Prov. Pat. App. No. 62/508,579, filed on 19 May 2017, entitled "SYSTEMS AND METHODS FOR MULTI-SPEAKER NEURAL TEXT-TO-SPEECH," each of the aforementioned documents is incorporated by reference herein in its entirety (which disclosures may be generally referred to, for convenience, as "Deep Voice 2" or "DV2") on the LibriSpeech dataset without speaker embeddings. The WaveNet architecture was conditioned on spectrograms to predict the waveform. The same hyperparameters were kept aside from increasing the number of layers to 40 and trained until convergence (~1.3M iterations).

b) Synthesized Audio Waveform Quality

Figure 5:
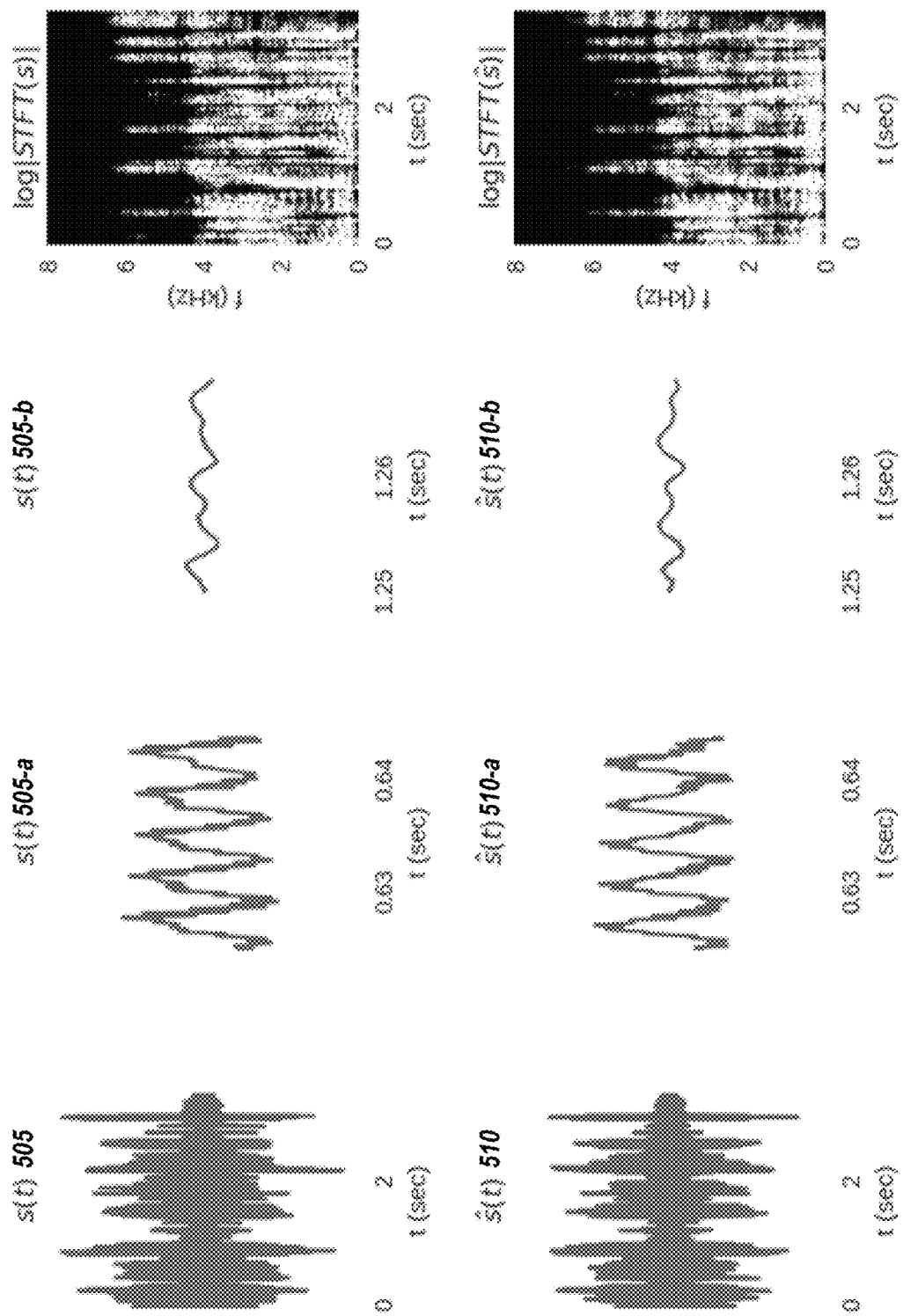
FIG. 5 depicts an example comparison of the waveform (entire utterance and two zoomed portions) and the spectrogram, for the ground truth sample and generated using convolutional GAN vocoder, according to embodiments of the present disclosure.

A synthesized audio waveform is exemplified in FIG. 5. FIG. 5 depicts an example comparison of the waveform (entire utterance and two zoomed portions) and the spectrogram, for the ground truth sample 505 and the synthesized version 510 generated using convolutional GAN vocoder. It was observed that complicated waveform patterns can be fit, and there is a small phase error between relevant high-amplitude spectral components (the amount of shift between the peaks is low). More examples are shown with respect to Appendix C.

The quality of synthesis was evaluated on held-out LibriSpeech samples (see Table 1) and an unseen speaker (see Table 2) using mean opinion score (MOS), spectral convergence, and classification accuracy to measure the distinguishability of speakers post synthesis.

For MOS, human ratings were collected via Amazon Mechanical Turk framework independently for each evaluation, and multiple votes on the same sample were aggregated by a majority voting rule.

For classification accuracy, an embodiment of the speaker classifier model from S. Ö. Arik, J. Chen, K. Peng, W. Ping, and Y. Zhou, "Neural Voice Cloning with a Few Samples," available at arXiv:1802.06006, 2018, and which is also disclosed in commonly-assigned U.S. patent application Ser. No. 16/143,330, filed on 26 Sep. 2018, entitled "SYSTEMS AND METHODS FOR NEURAL VOICE CLONING WITH A FEW SAMPLES," and U.S. Prov. Pat. App. No. 62/628,736, filed on 9 Feb. 2018, entitled "NEURAL VOICE CLONING WITH A FEW SAMPLES," and listing Sercan Ö. Arik, Jitong Chen, Kainan Peng, and Wei Ping as inventors. Each of the aforementioned documents are incorporated by reference herein in its entirety.

For the unseen LibriSpeech samples, the convolutional vocoder embodiment is on par with a high number of GL iterations in terms of naturalness and spectral convergence. WaveNet underperforms and generalizes poorly to an unseen speaker when trained with LibriSpeech. It was verified that the WaveNet implementation can indeed generate very high-quality audio for a dataset with higher quality audio and lower number of speakers. The low score of WaveNet may be related to the fact that the hyperparameters were not reoptimized for the LibriSpeech dataset, or it may be due to its sensitivity to low audio quality of training samples. GAN loss brings slight improvement in naturalness by enhancing the quality of the audio by minimizing the background artifacts (see Section G.4). The results are indeed pretty similar for the unseen speaker, showing the generalization capability of the model embodiment albeit a small penalty (which may be attributed to slightly overfitting the training distribution with the critic).

TABLE 1

Mean opinion score (MOS) with 95% confidence interval, spectral convergence, and speaker classification accuracy for LibriSpeech test samples. Spectral convergence is not shown for WaveNet because of the alignment mismatch of the synthesized waveform with initial silence padding.

| Waveform synthesis model | MOS (out of 5) | Spectral convergence (dB) | Classification accuracy (%) |
|---|---|---|---|
| Convolutional vocoder without GAN | 2.38 ± 0.31 | −8.7 | 62.5 |
| Convolutional GAN vocoder | 3.05 ± 0.25 | −8.0 | 56.3 |
| WaveNet | 1.73 ± 0.27 | | 43.8 |
| GL (3 iterations) | 2.64 ± 0.23 | −7.6 | 87.5 |
| GL (50 iterations) | 3.61 ± 0.27 | −14.8 | 83.3 |
| SPSI | 2.02 ± 0.26 | −6.5 | 62.5 |
| SPSI + GL (3 iterations) | 3.11 ± 0.32 | −10.6 | 70.8 |
| SPSI + GL (50 iterations) | 3.97 ± 0.29 | −15.1 | 72.9 |
| Ground truth | 4.34 ± 0.21 | −∞ | 87.5 |

TABLE 2

Mean opinion score (MOS) with 95% confidence interval and spectral convergence for an unseen speaker (from an internal dataset). Spectral convergence is not shown for WaveNet because of the alignment mismatch of the synthesized waveform with initial silence padding.

| Waveform synthesis model | MOS (out of 5) | Spectral convergence (dB) |
|---|---|---|
| Convolutional vocoder without GAN | 2.71 ± 0.29 | −10.3 |
| Convolutional GAN vocoder | 2.75 ± 0.28 | −9.4 |
| WaveNet | 1.45 ± 0.35 | |
| GL (3 iterations) | 2.58 ± 0.28 | −7.9 |
| GL (50 iterations) | 3.48 ± 0.29 | −16.6 |
| SPSI | 2.20 ± 0.28 | −6.5 |
| SPSI + GL (3 iterations) | 3.08 ± 0.29 | −11.1 |
| SPSI + GL (50 iterations) | 4.13 ± 0.31 | −17.1 |
| Ground truth | 4.38 ± 0.25 | −∞ | c) Representation Learning of the Frequency Basis

Figure 6:
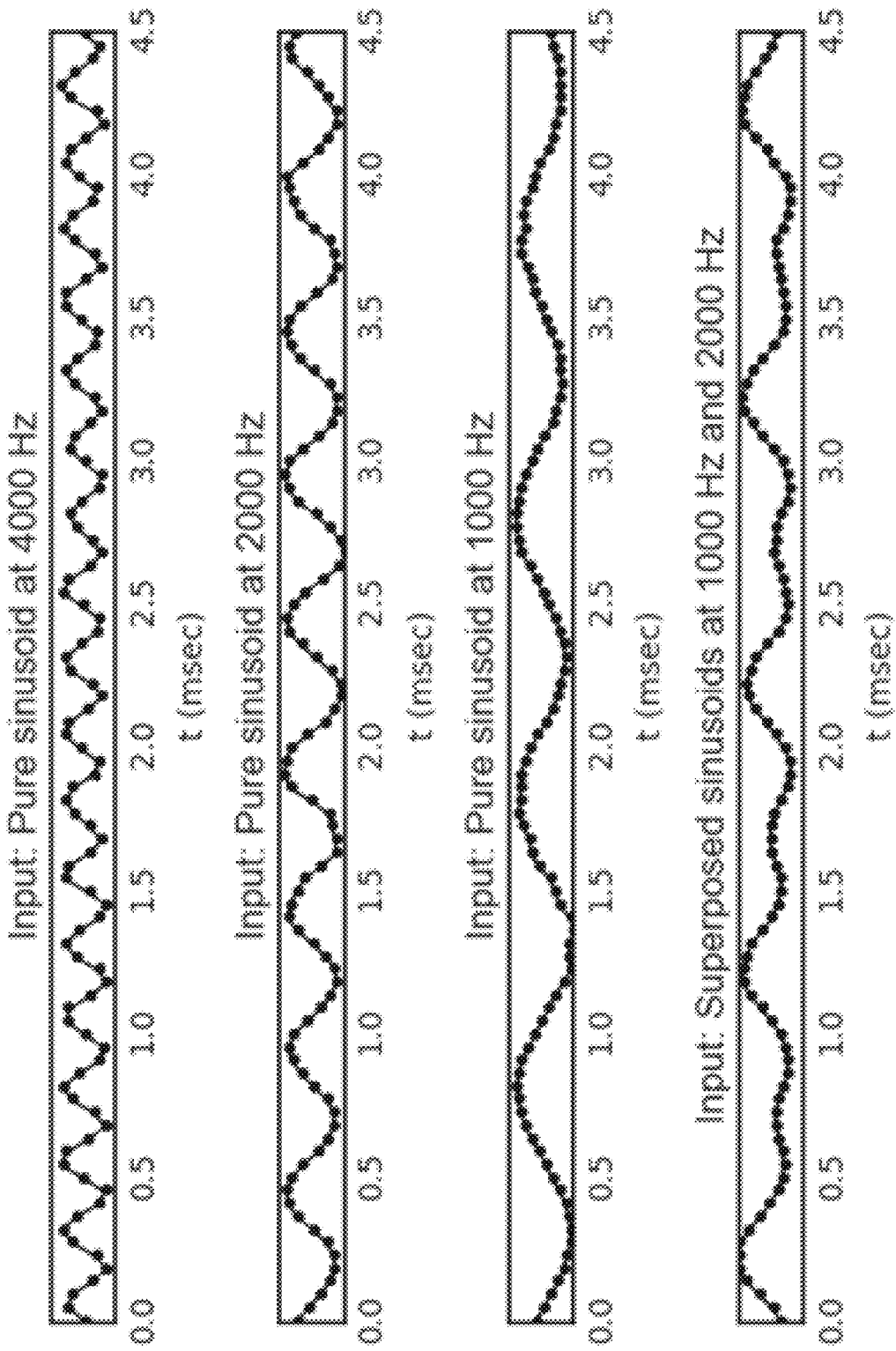
FIG. 6 depicts synthesized waveforms for spectrogram inputs with constant frequencies at 4000, 2000, and 1000

The convolutional vocoder model embodiment was trained only with human speech, which comprises time-varying signals at many frequencies. But, interestingly, the model embodiment learned the Fourier basis representation in the spectral range of human speech as demonstrated in FIG. 6. FIG. 6 depicts synthesized waveforms for spectrogram inputs with constant frequencies at 4000, 2000, and 1000 Hz, and for a spectrogram input of superposed sinusoids at 1000 and 2000 Hz, according to embodiments of the present disclosure. When spectrograms with constant frequencies are input, sinusoidal waveforms at those frequencies are synthesized. Moreover, when the input spectrograms contain a few frequency bands, the synthesized waveform is also the superposition of pure sinusoids of constituent frequencies.

d) Analysis of the Critic Guidance

To understand what the critic has learned and how it influences the vocoder, the Cramer distance gradient with respect to the generated audio for a trained model may be visualized. The gradient was overlaid on the generated and residual spectrograms in FIG. 7 to show regions of audio that the critic is most sensitive to. FIG. 7 shows visualization of guidance from the critic, according to embodiments of the present disclosure. Image 700 is the gradient shown on generated audio, and image 705 is the gradient shown on log spectrogram difference. The critic gradient is computed with respect to the generated audio and depicted in log scale in color. Brightness shows the log-scale frequency content of the signal over which gradient is overlaid. The gradient aligns with the residual in human vocal range, partially acting as a distance metric. Low-frequency gradient is orders of magnitude smaller than higher frequency content, but it is distributed to correct for the lower frequency distortion. High-frequency gradient does not have a high-level structure conducive to decreasing the error, but its periodic peaks line up with the overall stride along time. Indeed, without GAN objective, spectrograms of the generated audios suffer more from checkerboard artifacts commonly created by transposed convolutions, and constant-frequency noise in high frequencies, exemplified in FIG. 8. FIG. 8 shows spectrograms of generated samples without GAN (800) and with GAN training (805), according to embodiments of the present disclosure.

e) Deployment Considerations

The inference complexity and compute intensity (based on the assumptions presented in Appendix A) and benchmark latency were benchmarked on a Nvidia Tesla P100 GPU. The Tensorflow implementation of operations were considered without specific kernel optimizations. It should be noted that further improvements can be obtained with further optimizations. For a fair comparison, an implementation of GL using Tensorflow FFT/inverse FFT operations on GPU was considered.

The computational complexity of the convolutional GAN vocoder embodiment is around 4 GFLOPs/second. It achieved ~8.2M samples/sec—513 times faster than real-time waveform synthesis. Compared to the tested model embodiment, the latency of GL is ~2 times slower for 3 iterations, and ~32 times slower for 50 iterations (see Table 3). Although the tested embodiment required more compute (FLOPs/s) than GL, it requires less GPU DRAM bandwidth (byte/s). Indeed, the compute intensity of the model embodiment, 65 FLOPs/byte, is much higher than of a GL iteration, 1.9 FLOPs/byte. A high compute intensity is important for better utilizing the compute resources like GPU. In addition, the model embodiment has a shorter critical path of dependent operations in its compute graph compared to GL (18 ops vs. 27 ops in 3 GL iterations and 450 ops in 50 GL iterations). So, the embodiments herein are better suited to GPU parallelization.

the number of channels is balanced with temporal upsampling by a factor of two. The coefficients of the loss functions in Section D, above, were chosen as 1, 6, 10, and 1, respectively, optimized for the audio quality by employing a random grid search. The model was trained using the Adam optimizer. The initial learning rate of 0.0005 was annealed at a rate of 0.94 every 5000 iterations. The model was trained for ~600k iterations with a batch size of 16 distributed across 4 GPUs with synchronous updates. The results were compared to conventional implementations of GL and SPSI with and without extra GL iterations.

b) Synthesized Audio Waveform Quality

A synthesized audio waveform is exemplified in FIG. 9. FIG. 9 depicts comparison of the waveform (entire utterance and a zoomed portion) and its spectrogram, for the ground truth (left/905) and MCNN-generated (right/910), according to embodiments of the present disclosure. It was observed that complicated patterns can be fit, and there is a small phase error between relevant high-amplitude spectral components (the amount of shift between the peaks is low). The quality of synthesis was evaluated on the held-out LibriSpeech samples (see Table 4, below) using mean opinion score (MOS), SC, and classification accuracy to measure the distinguishability of 2484 speakers.

For MOS, human ratings were collected via Amazon Mechanical Turk framework independently for each evaluation, and multiple votes on the same sample were aggregated by a majority voting rule.

For classification accuracy, an embodiment of the speaker classifier model from S. Ö. Arik, J. Chen, K. Peng, W. Ping, and Y. Zhou, "Neural Voice Cloning with a Few Samples," available at arXiv:1802.06006, 2018, and which is also disclosed in commonly-assigned U.S. patent application Ser. No. 16/143,330, filed on 26 Sep. 2018, entitled "SYSTEMS AND METHODS FOR NEURAL VOICE CLONING WITH A FEW SAMPLES," and U.S. Prov. Pat. App. No. 62/628,736, filed on 9 Feb. 2018, entitled "NEURAL VOICE CLONING WITH A FEW SAMPLES," and listing Sercan Ö. Arik, Jitong Chen, Kainan Peng, and Wei Ping as inventors. Each of the aforementioned documents are incorporated by reference herein in its entirety.

According to the subjective human ratings (MOS), MCNN outperformed GL, even with a high number of iterations and SPSI initialization. When trained only on

TABLE 3

Mean opinion score (MOS) and inference metrics. Samples/s are derived from Tensorflow implementations without specific kernel optimizations, benchmarked on NVIDIA Tesla P100.

| Waveform synthesis model | MOS (out of 5) | Samples/s | Real-time Factor | Complexity | Compute Intensity |
|---|---|---|---|---|---|
| Convolutional GAN vocoder | 3.05 ± 0.25 | 8.21M | 513× | 4.05 GFLOPs/s | 65 FLOP/byte |
| GL (3 iterations) | 2.64 ± 0.23 | 4.16M | 260× | 0.0254 GFLOPs/s | 1.88 FLOP/byte |
| GL (50 iterations) | 3.61 ± 0.27 | 265K | 16.6× | 0.386 GFLOPs/s | 1.91 FLOP/byte |

2. Multi-Head CNN Embodiments a) Experimental Setup

As with the single-head CNN test embodiments, the LibriSpeech dataset, after a preprocessing pipeline, comprising segmentation and denoising, similar to that in Deep Voice 3, was used.

As the spectrogram parameters, a hop length of 256 (16 ms duration), a Hanning window with a length of 1024 (64 ms duration), and a FFT size of 2048 were assumed. The tested MCNN embodiment had 8 transposed convolution layers, with $(s_i, w_i, c_i)=(2, 13, 2^{8-i})$ for $1 \leq i \leq 8$, i.e. halving in spectral convergence (SC), the MCNN embodiment was on par with GL with a very high number of iterations. Indeed, merely having SC loss as the training objective yielded even slightly better SC for test samples.

Yet, with only SC loss, lower audio quality was observed for some samples due to generated background noise and less clear high frequency harmonics, as exemplified in FIG. 10. FIG. 10 depicts Log-STFT of synthesized sample for MCNN trained with only SC loss (top) and all losses (bottom), according to embodiments of the present disclosure. To further improve the audio quality, flexibility of MCNN embodiments for integration of other losses is beneficial, as seen from Table 4.

TABLE 4

MOS with 95% confidence interval, average spectral convergence, and speaker classification accuracy for LibriSpeech test samples.

| Model | MOS (out of 5) | Spectral convergence (dB) | Classification accuracy (%) |
| --- | --- | --- | --- |
| MCNN (filter width of 13, 8 heads, all losses) | 3.50 ± 0.18 | −12.9 | 76.8 |
| MCNN (filter width of 9) | 3.26 ± 0.18 | −11.9 | 73.2 |
| MCNN (2 heads) | 2.78 ± 0.17 | −10.7 | 71.4 |
| MCNN (loss: Eq. (1)) | 3.32 ± 0.16 | −13.3 | 69.6 |
| MCNN (loss: Eq. (1) & Eq. (2b)) | 3.35 ± 0.18 | −12.6 | 73.2 |
| GL (3 iterations) | 2.55 ± 0.26 | −5.9 | 76.8 |
| GL (50 iterations) | 3.28 ± 0.24 | −10.1 | 78.6 |
| GL (150 iterations) | 3.41 ± 0.21 | −13.6 | 82.1 |
| SPSI | 2.52 ± 0.28 | −4.9 | 75.0 |
| SPSI + GL (3 iterations) | 3.18 ± 0.23 | −8.7 | 78.6 |
| SPSI + GL (50 iterations) | 3.41 ± 0.19 | −11.8 | 78.6 |
| Ground truth | 4.20 ± 0.16 | −∞ | 85.7 |

Ablation studies also show a sufficiently large filter width and a sufficiently high number of heads are important. Transposed convolutions tend to produce checkerboard-like patterns, and a single-head may not be able to generate all frequencies efficiently. In an ensemble, however, different heads cooperate to cancel out artifacts and cover different frequency bands, as further elaborated in Appendix B. Lastly, high speaker classification accuracy shows that MCNN embodiments can efficiently preserve the characteristics of speakers (e.g., pitch, accent, etc.) without any conditioning, showing potential for direct integration into training for applications like voice cloning.

c) Generalization and Optimization to a Particular Speaker

The audio quality is maintained even when an MCNN embodiment trained on LibriSpeech is used for an unseen speaker (from a high-quality text-to-speech dataset, such as described by S. Ö. Arik, M. Chrzanowski, A. Coates, G. Diamos, A. Gibiansky, Y. Kang, X. Li, J. Miller, A. Ng, J. Raiman, S. Sengupta, and M. Shoeybi in "Deep voice: Real-time neural text-to-speech," vol. 70, pp. 195-204, 06-11 Aug. 2017 (also available at arxiv.org/pdf/1702.07825.pdf) and described in commonly-assigned U.S. Pat. No. 10,872,598, filed issued on 29 Jan. 2018 22 Dec. 2020, entitled "SYSTEMS AND METHODS FOR REAL-TIME NEURAL TEXT-TO-SPEECH," and U.S. Prov. Pat. App. No. 62/463,482, filed on 24 Feb. 2017, entitled "SYSTEMS AND METHODS FOR REAL-TIME NEURAL TEXT-TO-SPEECH," each of the aforementioned patent documents is incorporated by reference herein in its entirety (which disclosures may be referred to, for convenience, as "Deep Voice 1"), as shown in Table 5. To evaluate how much the quality can be improved, a separate MCNN model embodiment was trained using only that particular speaker's audio data, with reoptimized hyperparameters. Filter width was increased to 19 to improve the resolution for modeling of more clear high frequency components. Lower learning rate and more aggressive annealing were applied due to the small size of the dataset, which is ~20 hours in total. Loss coefficient of Eq. 2b was increased because the dataset was higher in quality and yields lower SC. The single-speaker MCNN model embodiment yielded a very small quality gap with the ground truth.

TABLE 5

MOS with 95% confidence interval for single-speaker samples (from an internal dataset from Deep Voice 1).

| Model | MOS (out of 5) |
| --- | --- |
| MCNN (trained on LibriSpeech) | 3.55 ± 0.17 |
| MCNN (trained on single-speaker) | 3.91 ± 0.17 |
| GL (150 iterations) | 3.84 ± 0.16 |
| SPSI + GL (50 iterations) | 3.69 ± 0.17 |
| Ground truth | 4.28 ± 0.14 | d) Representation Learning of the Frequency Basis

The MCNN embodiment was trained only with human speech, which comprises time-varying signals at many frequencies. Interestingly, like the single-head CNN, the MCNN embodiment learned the Fourier basis representation in the spectral range of human speech, as shown in FIG. 11 (representations get poorer for higher frequencies beyond human speech, due to the increased train-test mismatch). FIG. 11 depicts synthesized waveforms by an MCNN embodiment (trained on LibriSpeech), for spectrogram inputs corresponding to sinusoids at 500, 1000 and 2000 Hz, and for a spectrogram input of superposed sinusoids at 1000 and 2000 Hz, according to embodiments of the present disclosure. When the input spectrograms correspond to constant frequencies, sinusoidal waveforms at those frequencies are synthesized. When the input spectrograms correspond to a few frequency bands, the synthesized waveforms are superpositions of pure sinusoids of constituent frequencies. For all cases, phase coherence over a long-time window was observed.

e) Deployment Considerations

The inference complexity and compute intensity (based on the assumptions presented in Appendix A) and runtime were benchmarked on a Nvidia Tesla P100 GPU. The Tensorflow implementation of operations without specific kernel optimizations was considered, which can yield to further improvements specific to the hardware. For a fair comparison, the GPU implementation of GL using Tensorflow FFT/inverse FFT operations was considered. The baseline MCNN model embodiment from Table 4 (the one in bold font) can generate ~5.2M samples/sec, yielding ~330 times faster than-real-time waveform synthesis. Compared to the MCNN embodiment, the runtime of GL is ~20 times slower for 50 iterations, and ~60 times slower for 150 iterations.

The computational complexity of the MCNN embodiment is ~2.2 GFLOPs/sec, and indeed was slightly higher than the complexity of 150 GL iterations. However, much shorter runtime was due to the properties of the neural network architecture that render it very well suited for modern multi-core processors like GPUs or TPUs. First and foremost, the MCNN embodiment required much less DRAM bandwidth (in byte/s)—the compute intensity of the MCNN embodiment, 61 FLOPs/byte, is more than an order of magnitude higher than that of GL, 1.9 FLOPs/byte. In addition, the MCNN embodiment had a shorter critical path of dependent operations in its compute graph compared to GL, yielding parallelization and utilization. Efficient inference with such a highly-specialized model was enabled by learning from large-scale training data, which is not possible for signal processing algorithms like GL.

H. Some Conclusions

Presented herein are embodiments that show the potential of the convolutional neural network architectures for the perennial spectrogram inversion problem to achieve a very low latency without noticeably sacrificing the perceptual quality. Such architectures will benefit even more from future hardware in ways that traditional iterative signal processing techniques like GL and autoregressive models like WaveNet cannot take advantage of.

It is demonstrated that embodiments of the convolutional GAN model can use a large-scale and low-quality dataset for training to generalize to unseen speakers and learn pure frequency basis. In one or more embodiments, the guidance by the critic in a GAN framework helps suppress checkerboard artifacts from upsampling and the constant frequency noise, yielding slightly higher audio quality to human raters. Improving the GAN algorithm to recognize attributes pertaining to perceptual quality will bridge the gap between models like WaveNet with the appropriate inductive bias.

One of the limitations for the output audio quality is the low quality of the speech recognition dataset used. A higher quality dataset is expected to improve the synthesis quality. Quality improvements may be achieved by using a low quality but much larger datasets. It should be noted that embodiments may be integrated into end-to-end training of other generative audio models, such as text-to-speech or audio style transfer applications.

Also presented herein are embodiments of a MCNN architecture for the spectrogram inversion problem. MCNN embodiments achieve very fast waveform synthesis without noticeably sacrificing the perceptual quality. MCNN embodiments may be trained on a large-scale speech dataset and can generalize well to unseen speech or speakers. MCNN embodiments may benefit even more from future hardware in ways that autoregressive neural network models and traditional iterative signal processing techniques like GL cannot take advantage of. In addition, MCNN embodiments will benefit from larger scale audio datasets, which are expected to close the gap in quality with ground truth. MCNN embodiments may be integrated into end-to-end training of other generative audio models, such as text-to-speech or audio style transfer systems.

I. Appendices

1. Appendix A—Complexity Modeling

Computational complexity of operations is represented by the total number of algorithmic FLOPs without considering hardware-specific logic-level implementations. (Such a complexity metric also has limitations of representing some major sources of power consumption, such as loading and storing data). All point-wise operations (including nonlinearities) are counted as 1 FLOP, which is motivated with the trend of implementing most mathematical operations as a single instruction. The complexities of register memory-move operations were ignored. It was assumed that a matrix-matrix multiply, between W, an m×n matrix and X, an n×p matrix takes 2 mnp FLOPs. Similar expression was generalized for multi-dimensional tensors, that were used in convolutional layers. For real-valued fast Fourier transform (FFT), the complexity of $2.5N\log_2(N)$ FLOPs for a vector of length N was assumed. For most operations used in this patent document, Tensorflow profiling tool includes FLOP counts, which was directly adapted.

2. Appendix B—Analysis of Contributions of Multiple Heads

FIG. 12 shows the outputs of individual heads along with the overall waveform, according to embodiments of the present disclosure. The top row shows an example synthesized waveform and its log-STFT, and the bottom 8 rows show outputs of the waveforms of each of the constituent heads. For better visualization, waveforms are normalized in each head and small-amplitude components in STFTs were discarded after applying a threshold. It was observed that multiple heads focus on different portions of the waveform in time, and also on different frequency bands. For example, head 2 mostly focuses on low-frequency components. While training, individual heads are not constrained for such a behavior. In fact, different heads share the same architecture, but initial random weights of the heads determine which portions of the waveform they will focus on in the later phases of training. The structure of the network promotes cooperation with the end-to-end objective. Hence, initialization with the same weights would nullify the benefit of the multi-head architecture. Although intelligibility of individual waveform outputs is very low (it should also be noted that a nonlinear combination of these waveforms can also generate new frequencies that do not exist in these individual outputs), their combination can yield highly natural-sounding waveforms.

3. Appendix C—More Wavefore Synthesis Examples

Randomly-sampled waveform synthesis examples for the held-out LibriSpeech samples using a single-head CNN are shown in FIGS. 13-18.

FIGS. 13-18 each depicts an example comparison of the waveform (entire utterance as well as two different zoomed portions are shown) and the spectrogram of a ground truth sample vs. its generated version using the convolutional GAN vocoder, according to embodiments of the present disclosure.

J. Computing System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

FIG. 19 depicts a simplified block diagram of a computing device/information handling system (or computing system) according to embodiments of the present disclosure. It will be understood that the functionalities shown for system 1900 may operate to support various embodiments of a computing system—although it shall be understood that a computing system may be differently configured and include different components, including having fewer or more components as depicted in FIG. 19.

As illustrated in FIG. 19, the computing system 1900 includes one or more central processing units (CPU) 1901 that provides computing resources and controls the computer. CPU 1901 may be implemented with a microprocessor or the like, and may also include one or more graphics processing units (GPU) 1919 and/or a floating-point coprocessor for mathematical computations. System 1900 may also include a system memory 1902, which may be in the form of random-access memory (RAM), read-only memory (ROM), or both.

A number of controllers and peripheral devices may also be provided, as shown in FIG. 19. An input controller 1903 represents an interface to various input device(s) 1904, such as a keyboard, mouse, touchscreen, and/or stylus. The computing system 1900 may also include a storage controller 1907 for interfacing with one or more storage devices 1908 each of which includes a storage medium such as magnetic tape or disk, or an optical medium that might be used to record programs of instructions for operating systems, utilities, and applications, which may include embodiments of programs that implement various aspects of the present disclosure. Storage device(s) 1908 may also be used to store processed data or data to be processed in accordance with the disclosure. The system 1900 may also include a display controller 1909 for providing an interface to a display device 1911, which may be a cathode ray tube (CRT), a thin film transistor (TFT) display, organic light-emitting diode, electroluminescent panel, plasma panel, or other type of display. The computing system 1900 may also include one or more peripheral controllers or interfaces 1905 for one or more peripherals 1906. Examples of peripherals may include one or more printers, scanners, input devices, output devices, sensors, and the like. A communications controller 1914 may interface with one or more communication devices 1915, which enables the system 1900 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1916, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a neural network model for spectrogram inversion comprising:
   inputting an input spectrogram comprising a number of frequency channels into a convolution neural network (CNN) comprising at least one head, in which a head comprises a set of transposed convolution layers in which each transposed convolution layer is separated by a nonlinearity operation and the set of transposed convolution layers reduces the number of frequency channels of the input spectrogram to one channel after a last transposed convolution layer of the set of transposed convolution layers;

outputting from the CNN a synthesized waveform for the input spectrogram, the input spectrogram having a corresponding ground truth waveform;

using the corresponding ground truth waveform, the synthesized waveform, and a loss function comprising at least one or more loss components selected from spectral convergence loss and log-scale short-time Fourier transform (STFT)-magnitude loss to obtain a loss for the CNN; and using the loss to update the CNN.

2. The computer-implemented method of claim 1 wherein the CNN comprises:

a plurality of heads, in which each head receives the input spectrogram and comprises a set of transposed convolution layers in which each transposed convolution layer is separated by a nonlinearity operation and the set of transposed convolution layers reduces the number of frequency channels of the input spectrogram to one channel after a last transposed convolution layer of the set of transposed convolution layers.

3. The computer-implemented method of claim 2 wherein the heads of the plurality of heads are initialized with at least some different parameters to allow the CNN to focus on different portions of a waveform related to the input spectrogram during training.

4. The computer-implemented method of claim 2 wherein each head of the plurality of heads generates a head output waveform from the input spectrogram, the method further comprising:

obtaining a combination of the head output waveforms, in which the head output waveforms or combined in a weighed combination using a trainable weight value for each head output waveform.

5. The computer-implemented method of claim 1 further comprising:

applying a scaled softsign function to the weighted combination to obtain a final output waveform.

6. The computer-implemented method of claim 1 wherein the CNN further includes generative adversarial network (GAN) and the loss function further comprises a GAN loss component.

7. The computer-implemented method of claim 1 wherein the loss function further comprises one or more additional loss terms selected from instantaneous frequency loss, weighted phase loss, and waveform envelope loss.

8. The computer-implemented method of claim 1 wherein the CNN is trained with a large-scale multi-speaker dataset that produces a trained CNN for synthesizing a waveform for a speaker who was not included in the large-scale multi-speaker dataset or trained with a single speaker dataset that produces a trained CNN for synthesizing a waveform for the single speaker.

9. A computer-implemented method for using a trained convolutional neural network to generate a waveform from a spectrogram, the method comprising:

inputting an input spectrogram comprising a number of frequency channels into a trained convolution neural network (CNN) comprising at least one head, in which a head comprises a set of transposed convolution layers in which each transposed convolution layer is separated by a nonlinearity operation and the set of transposed convolution layers reduces the number of frequency channels of the input spectrogram to one channel after a last transposed convolution layer of the set of transposed convolution layers and the head outputs an output waveform;

applying a scaling function to the output waveform to obtain a final synthesized waveform; and outputting the final synthesized waveform corresponding to the input spectrogram.

10. The computer-implemented method of claim 9 wherein the trained CNN comprises:

a plurality of heads, in which each head receives the input spectrogram, outputs a head output waveform, and comprises a set of transposed convolution layers in which each transposed convolution layer is separated by a nonlinearity operation and the set of transposed convolution layers reduces the number of frequency channels of the input spectrogram to one channel after a last transposed convolution layer of the set of transposed convolution layers.

11. The computer-implemented method of claim 10 wherein the output waveform is obtained by performing the step comprising:

combining the head output waveforms of the plurality of heads into the output waveform using a weighed combination of the head output waveforms wherein a head's output waveform is weighted using a trained weight value for that head.

12. The computer-implemented method of claim 9 further comprising wherein the scaling function is a scaled softsign function.

13. The computer-implemented method of claim 9 wherein the trained CNN was trained using a loss function comprising at least one or more loss components selected from spectral convergence loss, log-scale short-time Fourier transform (STFT)-magnitude loss, instantaneous frequency loss, weighted phase loss, and waveform envelope loss.

14. The computer-implemented method of claim 13 wherein the trained CNN was trained using a generative adversarial network (GAN) and the loss function further comprised a GAN loss component.

15. The computer-implemented method of claim 9 further comprising converting the input spectrogram from a mel-spectrogram.

16. A non-transitory computer-readable medium or media comprising one or more sequences of instructions which, when executed by at least one processor, causes steps to be performed comprising:

inputting an input spectrogram comprising a number of frequency channels into a trained convolution neural network (CNN) comprising at least one head, in which a head comprises a set of transposed convolution layers in which each transposed convolution layer is separated by a nonlinearity operation and the set of transposed convolution layers reduces the number of frequency channels of the input spectrogram to one channel after a last transposed convolution layer of the set of transposed convolution layers and the head outputs an output waveform;

applying a scaling function to the output waveform to obtain a final synthesized waveform; and outputting the final synthesized waveform corresponding to the input spectrogram.

17. The non-transitory computer-readable medium or media of claim 16 wherein the trained CNN comprises:

a plurality of heads, in which each head receives the input spectrogram, outputs a head output waveform, and comprises a set of transposed convolution layers in which each transposed convolution layer is separated by a nonlinearity operation and the set of transposed convolution layers reduces the number of frequency channels of the input spectrogram to one channel after a last transposed convolution layer of the set of transposed convolution layers.

18. The non-transitory computer-readable medium or media of claim 17 wherein the output waveform is obtained by performing the step comprising:
  combining the head output waveforms of the plurality of heads into the output waveform using a weighed combination of the head output waveforms wherein a head's output waveform is weighted using a trained weight value for that head.

19. The non-transitory computer-readable medium or media of claim 16 wherein the trained CNN was trained using a loss function comprising at least one or more loss components selected from spectral convergence loss, log-scale short-time Fourier transform (STFT)-magnitude loss, instantaneous frequency loss, weighted phase loss, waveform envelope loss, and a generative adversarial network (GAN) loss component.

20. The non-transitory computer-readable medium or media of claim 16 further comprising one or more sequences of instructions which, when executed by at least one processor, causes steps to be performed comprising:
  converting the input spectrogram from a mel-spectrogram.

* * * * *